United States Patent
Kuhn

(10) Patent No.: US 7,356,082 B1
(45) Date of Patent: Apr. 8, 2008

(54) VIDEO/AUDIO SIGNAL PROCESSING METHOD AND VIDEO-AUDIO SIGNAL PROCESSING APPARATUS

(75) Inventor: Peter M. Kuhn, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/890,230

(22) PCT Filed: Nov. 29, 1999

(86) PCT No.: PCT/JP99/06664

§ 371 (c)(1),
(2), (4) Date: Jan. 30, 2002

(87) PCT Pub. No.: WO01/41451

PCT Pub. Date: Jun. 7, 2001

(51) Int. Cl.
*H04B 1/66* (2006.01)

(52) U.S. Cl. ............ 375/240.16; 375/240.12; 375/240.25; 375/240.2; 348/699; 348/700; 382/233; 382/235; 382/238; 382/250

(58) Field of Classification Search ........ 375/240.16, 375/240.15, 240.12, 240.14, 240.2, 240.25, 375/240.26, 240.08; 348/699, 700; 382/233, 382/235, 243, 250, 238
See application file for complete search history.

(56) References Cited

U.S. PATENT DOCUMENTS 5,598,216 A * 1/1997 Lee ................. 375/240.16
5,668,600 A * 9/1997 Lee ................. 375/240.16
5,668,608 A * 9/1997 Lee ..................... 348/699
5,708,767 A 1/1998 Yeo et al.
5,760,846 A 6/1998 Lee
5,936,671 A 8/1999 Van Beek et al.
5,946,041 A 8/1999 Morita
5,978,030 A * 11/1999 Jung et al. ......... 375/240.16
6,137,544 A * 10/2000 Dimitrova et al. ..... 348/700
6,404,817 B1 * 6/2002 Saha et al. ......... 375/240.27

FOREIGN PATENT DOCUMENTS

WO    WO 98/52356    11/1998

OTHER PUBLICATIONS

Koc, et al., "DCT-Based Motion Estimation," IEEE Transactions on Image Processing, US, IEEE Inc., NY, vol. 7, No. 7, Jul. 1, 1998, pp. 948-965.

Merhav, et al., "Fast Algorithms for DCT-Domain Image Down-Sampling and for Inverse Motion Compensation," IEEE Transactions on Circuits and Systems for Video Technology, US, IEEE, Inc., NY, vol. 7, No. 3, Jun. 1, 1997, pp. 468-476.

Zhong, et al., "Clustering Methods for Video Browsing and Annotation," Proceedings of Spie, US, Bellingham, Spie, Feb. 1, 1996, pp. 239-246.

* cited by examiner

*Primary Examiner*—Shawn S. An
(74) *Attorney, Agent, or Firm*—Frommer Lawrence & Haug LLP; William S. Frommer; Paul A. Levy

(57) ABSTRACT

A metadata extraction unit has a feature point selection and motion estimation unit 62 for extracting at least one feature point representing characteristics of the video/audio signals in a compressed domain of the video/audio signals. Thus, reduction of time or cost for processing can be realized and it makes it possible to process effectively.

47 Claims, 14 Drawing Sheets

| D00 | D01 | D02 | D03 | D04 | D05 | D06 | D07 |
|-----|-----|-----|-----|-----|-----|-----|-----|
| D10 | D11 | D12 | D13 | D14 | D15 | D16 | D17 |
| D20 | D21 | D22 | D23 | D24 | D25 | D26 | D27 |
| D30 | D31 | D32 | D33 | D34 | D35 | D36 | D37 |
| D40 | D41 | D42 | D43 | D44 | D45 | D46 | D47 |
| D50 | D51 | D52 | D53 | D54 | D55 | D56 | D57 |
| D60 | D61 | D62 | D63 | D64 | D65 | D66 | D67 |
| D70 | D71 | D72 | D73 | D74 | D75 | D76 | D77 |

FIG.11

VIDEO/AUDIO SIGNAL PROCESSING METHOD AND VIDEO-AUDIO SIGNAL PROCESSING APPARATUS

TECHNICAL FIELD

This invention relates to a video/audio signal processing method and a video/audio signal processing apparatus, and it provides a computationally efficient method for this to facilitate applications like (but not restricted to) camera motion extraction and video summarization from MPEG compressed domain.

BACKGROUND ART

With the increasing capacity of video storage devices, the need emerges for structuring and summarization of video content for convenient browsing by the user. Video browsing is enabled by metadata (i.e. data about data), which is preferably extracted automatically.

FIG. 1 depicts the prior art of motion related metadata extraction from MPEG (Moving Picture Experts Group) compressed video in the pel domain. Full decoding of MPEG video into the pel domain is performed by an MPEG decoding unit 11. A motion estimation unit 12 (based on optical flow calculation or block matching which is known to the skilled in the art) calculates motion vectors from the pel representation of the video stream. The parametric and camera motion calculation unit 13 calculates from these motion vectors the motion related metadata.

For camera motion estimation in the pel domain there are existing patents "U.S. Pat. No. 5,751,838: 5/1998: Ingemar J. Cox, Sebastien Roy: Correction of camera motion between two image frames: 382/107" and publications.

"Yi Tong Tse, Richard L. Baker: Global Zoom/Pan estimation and compensation for video compression: ICASSP 91, 1991, pp. 2725-2728" estimates camera zoom and pan for video encoding. However, this method may produce unreliable results in case of other camera motion types than the modeled ones.

"A. Akutsu, Y. Tonomura, H. Hashinoto, Y. Ohba: Video indexing using motion vectors: SPIE vol. 1818 Visual Communications and Image Processing, 1992, pp. 1522-1530" extracts camera motion in the pel domain using the Hough transformation, though the described method does not extract the amount of the camera motion.

"Jong-Il Park, Nobuyuki Yagi, Kazumasa Enami, Kiyoharu Aizawa, Mitsutoshi Hatori Estimation of Camera Parameters from Image Sequence for model based video coding: IEEE Trans. CSVT, vol. 4, no. 3, June 1994, pp 288-296" and "Jong-Il Park, Choong Woong Lee: Robust estimation of camera parameters from image sequence for video composition: Signal Processing: Image Communication: vol. 9, 1996, pp 43-53" find feature points in the pel domain using a texture gradient and determine the camera motion from the motion of these feature points.

"Jong-Il Park, Choong Woong Lee: Robust estimation of camera parameters from image sequence for video composition: Signal Processing: Image Communication: vol. 9, 1996, pp 43-53" uses an outlier rejection method to make the camera motion estimation in the pel domain more robust.

"Y. P. Tan, S. R. Kulkarni, P. J. Ramadge: A new method for camera motion parameter estimation: Proc. ICIP, 1995, pp 406-409" describes a recursive least squares method for camera motion estimation in the pel domain, based on the assumption of a small amount of camera motion.

"Philippe Joly, Hae-Kwang Kim: Efficient automatic analysis of camera work and microsegmentation of video using spatiotemporal images: Signal Processing Image communication, vol. 8, 1996, pp. 295-307" describes a camera motion estimation algorithm in the pel domain based on the Sobel operator or a threshold edge detection unit and spatiotemporal projection of the edges into line patterns. The line patterns are analyzed using the Hough transform to extract edges in motion direction.

In "M. V. Srinivasan, S. Venkatesh, R. Hosi: Qualitative estimation of camera motion parameters from video sequence: Pattern recognition, Elsevier, vol. 30, no. 4, 1997, pp 593-606", camera motion parameters are extracted from uncompressed video in the pel domain, where the amount of camera pan, tilt, rotation and zoom is provided separately.

"Richard R. Schultz, Mark G. Alford: Multiframe integration via the projective transform with automated block matching feature point selection: ICASSP 99, 1999" proposes a subpixel resolution image registration algorithm in the pel domain based on a nonlinear projective transform model to account for camera translation, rotation, zoom, pan and tilt.

"R. S. Jasinschi, T. Naveen, P. Babic-Vovk, A. J. Tabatabai: Apparent 3-D camera velocity extraction and its Applications: IEEE Picture Coding Symposium, PCS 99, 1999" describes a camera velocity estimation in the pel domain for the applications database query and sprite (mosaic) generation.

Due to the huge storage size of video content more and more video material is available in compressed MPEG-1/MPEG-2 or MPEG-4 format. However, the camera motion estimation algorithms developed for the pel domain (as listed above) are not directly applicable to the MPEG compressed domain. Therefore time consuming decoding of the MPEG compressed bitstream is required and as well a computational demanding motion estimation in the pel domain and a camera motion estimation has to be performed (FIG. 1).

More over, to circumvent the computational burden of MPEG video decompression and camera motion estimation in the pel domain, camera motion estimation performed in the compressed domain has been proposed. Previous work on camera motion estimation in the compressed domain is based on using MPEG motion vectors and fitting them into a parametric motion model describing camera motion.

FIG. 2 depicts the current state of the art of motion related metadata extraction from MPEG compressed video. Parsing of MPEG video is performed by an MPEG bitstream parsing unit 21. From this parsed bitstream the motion vectors are extracted 22 and passed to the parametric and camera motion calculation unit 23.

"V. Kobla, D. Doennann, K-I. Lin, C. Faloutsos: Compressed domain video indexing techniques using DCT and motion vector information in MPEG video: SPIE Conf on Storage and Retrieval for Image and Video Databases V: vol. 3022, February 1997, pp. 200-211" determines "flow-vectors" from MPEG compressed domain motion vectors by using a directional histogram to determine the overall translational motion direction. However, this basic model is not able to detect camera zoom and rotation.

"Roy Wang, Thomas Huang: Fast Camera Motion Analysis in MPEG domain: ICIP 99, Kobe, 1999" describes a fast camera motion analysis algorithm in MPEG domain. The algorithm is based on using MPEG motion vectors from P-frames and B-frames and interpolating motion vectors from B-frames for I-frames. An outlier rejection least square algorithm for parametric camera motion estimation is used to enhance the reliability of the camera motion parameter extraction from these motion vectors.

However, using MPEG motion vectors for camera motion estimation has several drawbacks.

First, motion vectors in a compressed MPEG stream do not represent the real motion but are chosen for fast or bitrate efficient compression at the encoder and depend on the encoder manufacturer's encoding strategy which is not standardized by MPEG and can differ significantly. For example, for fast MPEG encoding low complexity motion estimation algorithms are employed in contrast to high-bitrate and high quality MPEG encoding, where motion estimation algorithms with increased search range are used, cf. "Peter Kulm: Algorithms, Complexity Analysis and VLSI-Architectures for MPEG-4 Motion Estimation: Kluwer Academic Publishers, June 1999, ISBN 792385160".

Further, the performance of using MPEG motion vectors for camera motion estimation depends significantly of MPEG's Group of Picture (GOP) structure, the video sampling rate (e.g. 5 . . . 30 frames per second) and other factors, and is therefore not reliable for exact camera motion estimation. For example some MPEG encoder implementations in the market modify the GOP structure dynamically for sequence parts with fast motion.

More over, MPEG motion vectors (especially small ones) are often significantly influenced by noise and may be not reliable.

Further, in case of a restricted motion estimation search area used by some fast motion estimation algorithms, there may not exist long motion vectors.

Further more, I-frame only MPEG video contains no motion vectors at all. Therefore the algorithms based on employing MPEG motion vectors are not applicable here. I-frame only MPEG video is a valid MPEG video format, which is used in video editing due to the capability of frame exact cutting. In this field motion related metadata is very important, e.g for determining the camera work.

Further, some compressed video formats like DV and MJPEG are based on a similar DCT (Discrete Cosine Transform)—structure like the MPEG formats, but contain no motion information. Therefore the camera motion estimation algorithms based on motion vectors contained in the compressed stream are not applicable to these cases.

Moreover, interpolation of motion vectors for I-frames from B-frames fails in case of rapid camera or object motion, where new image content occurs.

DISCLOSURE OF THE INVENTION

In view of the foregoing state of the art, it is an object of the present invention to provide a video/audio signal processing method and a video/audio signal processing apparatus for extracting and browsing of motion related metadata from compressed video.

In the present invention, the main applications of motion metadata include video summarization, camera motion representation as well as motion based video browsing.

A video/audio signal processing method according to the present invention is adapted for processing supplied video/audio signals to attain the aforementioned object. The apparatus comprises the steps of: extracting at least one compressed domain feature point representing characteristics of said video/audio signals in a compressed domain of said video/audio signals; performing motion estimation of the feature points extracted by said extraction step; and tracking the feature points associated with a motion vector through a pre-set number of frames constructing said video/audio signals.

In the video/audio signal processing method according to the present invention, feature points of the video/audio signals are extracted in a compressed domain, motion estimation of the extracted feature points is performed, and the feature points associated with a motion vector are tracked.

Also, a video/audio signal processing apparatus according to the present invention is adapted for processing supplied video/audio signals in order to attain the aforementioned object. The apparatus comprises means for extracting at least one compressed domain feature point representing characteristics of said video/audio signals in a compressed domain of said video/audio signals; means for performing motion estimation of the feature points extracted by said extraction means; and means for tracking the feature points associated with a motion vector through a pre-set number of frames constructing said video/audio signals.

In the video/audio signal processing apparatus according to the present invention, feature points of the video/audio signals are extracted by the means for extracting compressed domain feature points in a compressed domain, motion estimation of the extracted feature points is performed by the means for performing motion estimation of the feature points, and the feature points associated with a motion vector are tracked by the means for tracking the feature points.

Further, a video/audio signal processing method is adapted for processing and browsing supplied video/audio signals in order to attain the aforementioned object. The method comprises the steps of: building hierarchically a camera motion transition graph, wherein the graph building step includes the step of providing a graph layout having at least one main camera motion transition graph and having a plurality of nodes representing other camera motion with the transition paths illustrated for a video sequence; browsing through the camera motion transition graph by depicting keyframes of a camera motion video sequence at the nodes; and browsing through the camera motion transition graph by depicting a graph representation of the camera motion at the nodes.

In the video/audio signal processing method according to the present invention, a camera motion transition graph is built hierarchically, browsing through the camera motion transition graph by depicting keyframes of a camera motion video sequence at the nodes is carried out, and browsing through the camera motion transition graph by depicting a graph representation of the camera motion at the nodes is carried out.

Furthermore, a video/audio signal processing apparatus according to the present invention is adapted for processing and browsing supplied video/audio signals in order to attain the aforementioned object. The apparatus comprises: means for building hierarchically a camera motion transition graph, wherein the graph building means includes the step of providing a graph layout having at least one main camera motion transition graph and having a plurality of nodes representing other camera motion with the transition paths illustrated for a video sequence; means for browsing through the camera motion transition graph by depicting keyframes of a camera motion video sequence at the nodes; and means for browsing through the camera motion transition graph by depicting a graph representation of the camera motion at the nodes.

In the video/audio signal processing apparatus according to the present invention, a camera motion transition graph is built hierarchically by the means for building graph, browsing through the camera motion transition graph by depicting keyframes of a camera motion video sequence at the nodes is carried out by the first means for browsing, and browsing through the camera motion transition graph by depicting a graph representation of the camera motion at the nodes is carried out by the second means for browsing.

Also, a video/audio signal processing method according to the present invention is adapted for extracting a hierarchical decomposition of a complex video selection for browsing in order to attain the aforementioned object. The method comprises the steps of: identifying video; collecting key frames from said video shots for representing each video segment; classifying the collections of key frames according to camera motion or global motion information; and building a graphical representation of the video, the graphical representation being based upon the results of said classifying step, temporal as well as camera motion information associated with each part of a video shot, wherein said graphical representation building step includes the step of representing each category of video shot by node.

In the video/audio signal processing method according to the present invention, video is identified, key frames are collected from video shots, the collected key frames are classified, and a graphical representation of the video is built.

Further, a video/audio signal processing apparatus according to the present invention is adapted for extracting a hierarchical decomposition of a complex video selection for browsing in order to attain the aforementioned object. The apparatus comprises: means for identifying video; means for collecting key frames from said video shots for representing each video segment; means for classifying the collections of key frames according to camera motion or global motion information; and means for building a graphical representation of the video, the graphical representation being based upon the results of said classifying step, temporal as well as camera motion information associated with each part of a video shot, wherein said graphical representation building step includes means for representing each category of video shot by node.

In the video/audio signal processing apparatus according to the present invention, video is identified by the means for identifying video, key frames are collected from video shots by the means for collecting key frames, the collected key frames are classified by the means for classifying, and a graphical representation of the video is built by the means for building a graphical representation of the video.

Moreover, a video/audio signal processing method according to the present invention is adapted for processing supplied video/audio signals in order to attain the aforementioned object. The method comprises the steps of: extracting at least one compressed domain feature point representing characteristics of said video/audio signals in a compressed domain of said video/audio signals.

In the video/audio signal processing method according to the present invention, feature points of video/audio signals are extracted in a compressed domain.

Also, a video/audio signal processing apparatus according to the present invention is adapted for processing supplied video/audio signals in order to attain the aforementioned object. The apparatus comprises: means for extracting at least one compressed domain feature point representing characteristics of said video/audio signals in a compressed domain of said video/audio signals.

In the video/audio signal processing apparatus according to the present invention, feature points of the video/audio signals are extracted in a compressed domain by the means for extracting compressed domain feature points.

Further, a video/audio signal processing method according to the present invention is adapted for processing supplied video/audio signals. The method comprises the steps of: performing motion estimation of at least one feature point representing characteristics of said video/audio signals in a compressed domain of said video/audio signals.

In the video/audio signal processing method according to the present invention, motion estimation of the extracted feature point is performed.

Moreover, a video/audio signal processing apparatus according to the present invention is adapted for processing supplied video/audio signals. The apparatus comprises: means for performing motion estimation of at least one feature points representing characteristics of said video/audio signals in a compressed domain of said video/audio signals.

In the video/audio signal processing apparatus according to the present invention, motion estimation of the extracted feature points is performed by the means for performing motion estimation.

BRIEF DESCRIPTION OF THE DRAWINGS

FIG. 11 shows the DCT coefficient numbering of an 8×8 DCT-block.

BEST MODE FOR CARRYING OUT THE INVENTION

Figure 1:
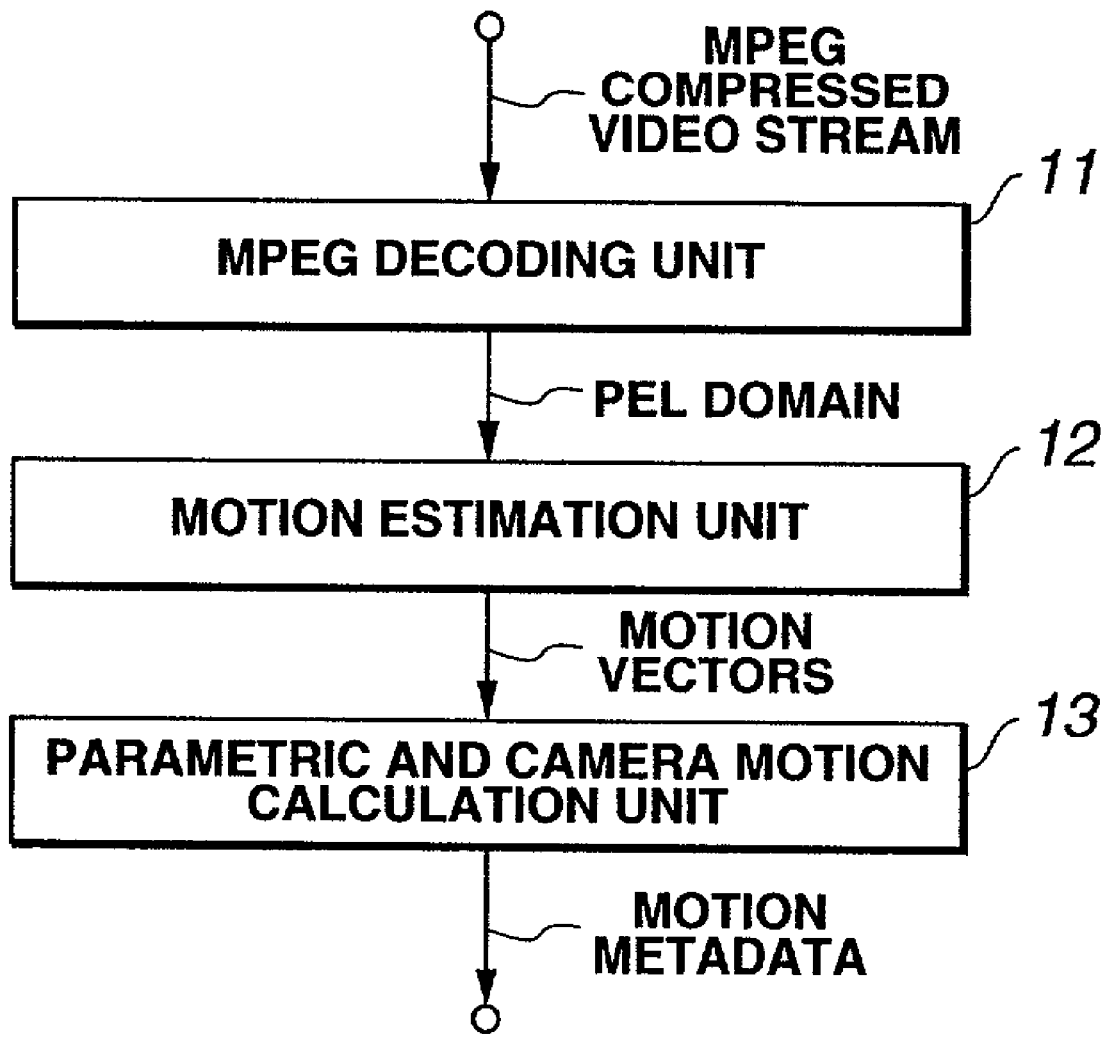
FIG. 1 depicts the prior art in motion metadata extraction.
Figure 2:
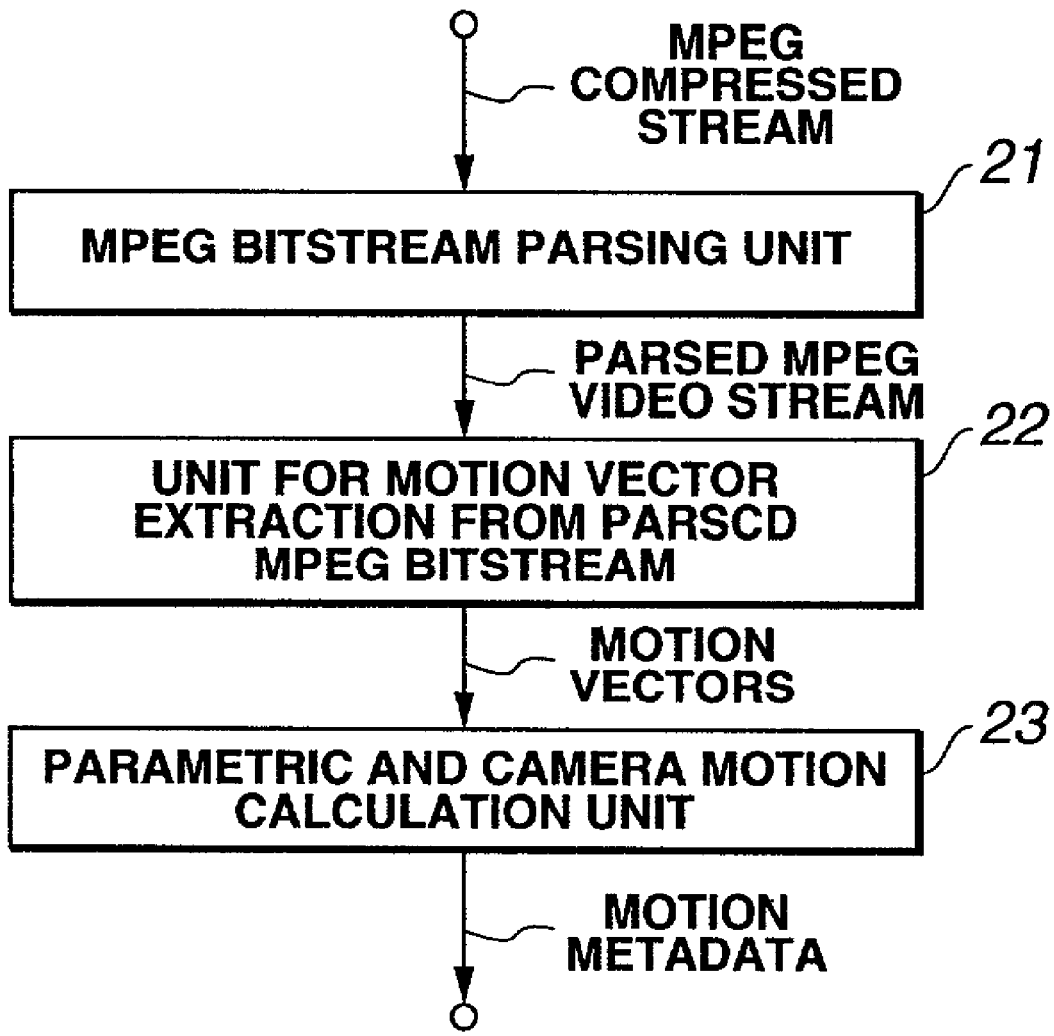
FIG. 2 depicts other prior art in motion metadata extraction.

The embodiments according to the present invention will now be described with reference to the attached drawings.

A new compressed domain feature point selection and motion estimation algorithm with applications including camera motion estimation, object motion estimation, video summarization, video transcoding, motion activity measurement, video scene detection, and video keyframe detection is disclosed in the present invention.

Existing feature point selection methodologies for object identification, object tracking, global motion estimation, and video summarization are applied in the pel domain and require therefore time consuming decoding of the compressed video bitstream.

The disclosed feature point selection algorithm works directly in the compressed-domain and thus avoids computationally expensive and time consuming decoding of the compressed video stream. A compressed domain preselection mechanism to determine candidate feature-points reduces the computational complexity significantly.

The feature point selection algorithm employs the texture information contained in the DCT (Discrete Cosine Transform) coefficients as well as MPEG (Moving Picture Experts Group) motion vectors (when existent) and is therefore directly applicable to a sequence of DCT-based compressed still images (like Motion JPEG (Joint Photographic Experts Group), MJPEG) and compressed video (like MPEG-1/MPEG-2/MPEG-4, ITU-T (International Telecommunication Union—Telecoimnunication Standardization Sector) recommendations H.261, H.263, H.26X, or the DV format).

This disclosure of invention describes the extraction of the feature-points in the compressed domain (using MPEG-1 as an example), and motion estimation for these feature points by taking advantage of the existing motion vectors in the MPEG compressed domain, as well as prediction error energy.

Further, the present invention discloses following applications using this feature point selection algorithm in the compressed domain.

(1) object identification and classification (2) object motion estimation for tracking (using e.g. parametric motion models or Kalman filters)

(3) global (camera) motion estimation (using a parametric camera motion model)

(4) motion activity calculation by using the motion vectors extracted by this method (5) video transcoding (determining the region of interest according to the location of the feature points in the frame and spending more bits for the region of interest by appropriate quantizer control, using camera motion parameters to facilitate the reencoding, or providing motion vectors for subsequent encoding)

(6) foreground/background segmentation in a video scene (by tracking the lifespan of the feature points, determining the global motion and the object motion of the feature points)

(7) video summarization and video scene detection (by tracking the lifetime of the feature points. When a large number of previously existing feature points disappear and a large number of new feature points emerge, then this is a sign for a new scene start, which can be used for video summarization)

(8) video keyframe detection (where keyframes are selected from parts of the video stream in which a large number of feature points do not change over the time)

(9) video browsing (using feature points and the object/global motion related to the feature points as well as keyframes according to the method described above for a hierarchical video representation)

(10) video mosaicing (by merging smaller parts of several video frames to create one single large image. The feature points are used here as reference points)

Figure 3:
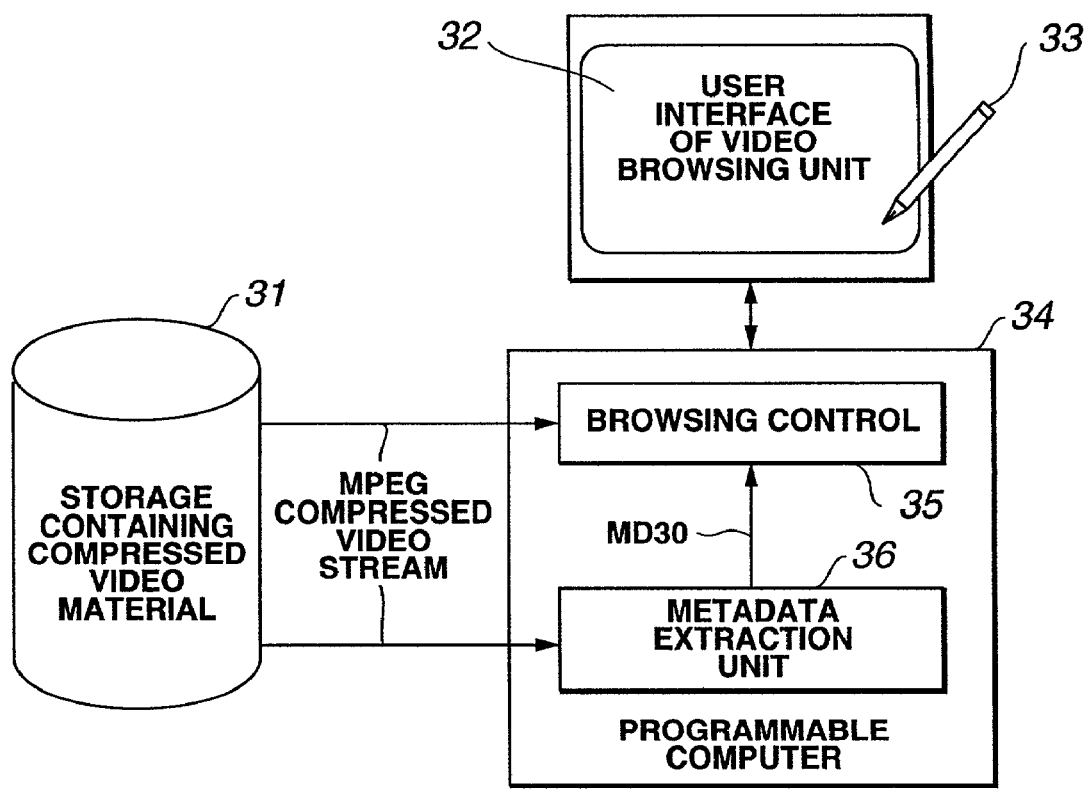
FIG. 3 depicts an overview on the video browsing and metadata extraction unit.

FIG. 3 depicts an overview on a metadata extraction and a video browsing unit. The described apparatus consists of a storage medium 31 (which includes optical, magnetic, electronic and electro mechanical media like CD-ROM, DVD-RAM, DVD-ROM, videotape, hard disk, RAM, ROM etc.), a metadata extraction unit 36 which supplies metadata MD 30 to the video browsing unit 35. The implementation of the metadata extraction unit 36 and the video browsing unit 35 may be based on a programmable computer 34, but other means are also possible. The video browsing unit 35 is controlled by an user interface unit 32 which is interacted by an human user 33.

The first preferred embodiment will now be described in detail.

This section gives first an overall overview and then, as the first preferred embodiment, the basic method of feature point selection and motion estimation in compressed domain is described. The other preferred embodiments describe a different method for the first preferred embodiment, as well as applications of this feature point selection and motion estimation method.

Figure 4:
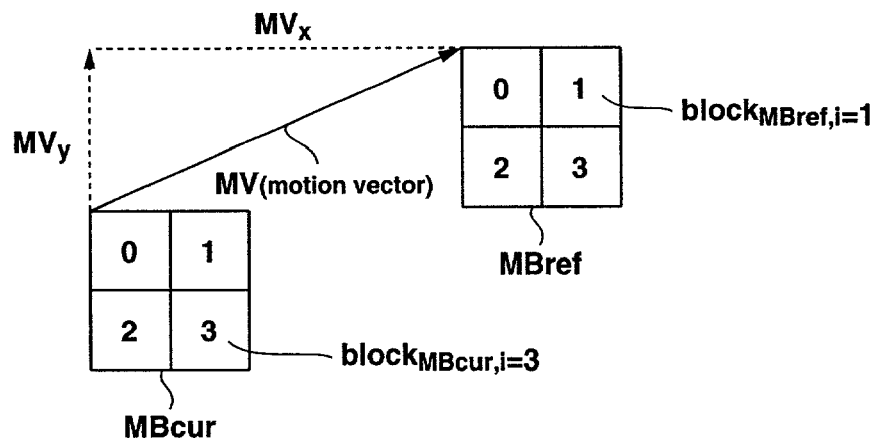
FIG. 4 gives the naming conventions on blocks and macroblocks.

FIG. 4 gives the notations for MPEG macroblocks (MB) with 16×16 pel size and their blocks with 8×8 pel size. The reference frame is, generally speaking, a frame at a different point in time compared to the current time. Without loss of generality, in this context the reference frame is assumed to be temporally subsequent to the current frame. The reference MBcur is a MB of the current (cur) frame or of the current Video Object Plane (VOP) in case of MPEG-4 and MBref is a MB of the reference (ref) frame or of the reference Video Object Plane (VOP) in case of MPEG-4, which is associated with a different time instance than the current frame or VOP. In the present invention the terminology "frame" includes also arbitrarily shaped objects (VOPs) as used in MPEG-4. MV is the motion vector with it's components $MV_x$ and $MV_y$ in x-direction and y-direction, respectively.

"Intra" is used here for intra coded macroblocks in MPEG and H.26X standards and recommendations as well as for DCT only coded blocks in DV format and MJPEG. "P-type" is used for prediction coded macroblocks in MPEG and H.26X standards and recommendations and "B-type" is used for bidirectional predicted macroblocks in MPEG and H.26X standards and recommendations.

Figure 5:
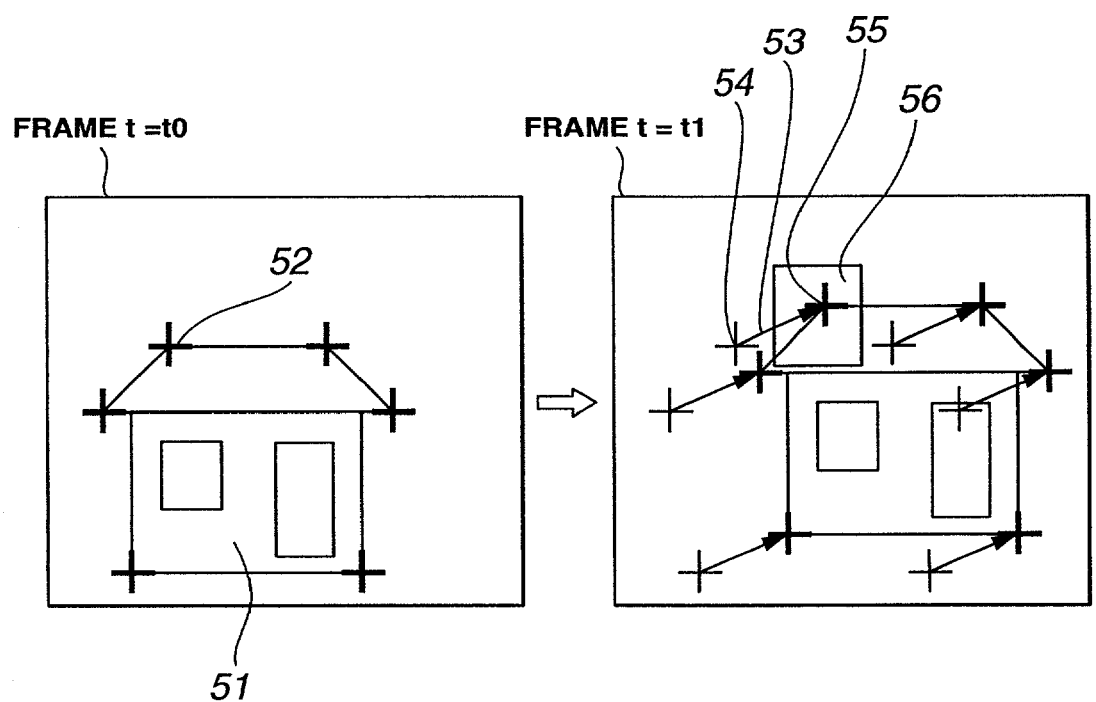
FIG. 5 gives a brief overview of the compressed domain feature point motion estimation concept.

FIG. 5 gives a general overview of the feature point extraction and motion estimation method. Feature points (or edge points in this example) are locations having abrupt changes in brightness, color or texture, for example and are therefore suited for motion estimation and motion tracking. 51 depicts a video object in the current frame at t=t0 with some edge points, one of these at location 52, for example. For a reference frame at t=t1, this edge point 52 (renumbered to 54 in the reference frame at t=t1) moves to the location 55. The movement is associated with an motion vector, 53. To find the motion vector, a motion estimation technique is performed within a search area 56, around a predicted motion vector. Some of the methods disclosed by the present invention are techniques on how to find the feature points in compressed domain and techniques for computationally efficient estimating the motion between two related feature points in the compressed domain. To be sure that the same two feature points at different time instances (or more than two feature points, in case of several feature points are representing an object) are associated together in order to find their motion vector, the present invention also discloses a signature technique for feature points in the compressed domain as well as in the pel domain. The signature technique is explained in more detail in step S83 of FIG. 8.

Figure 6:
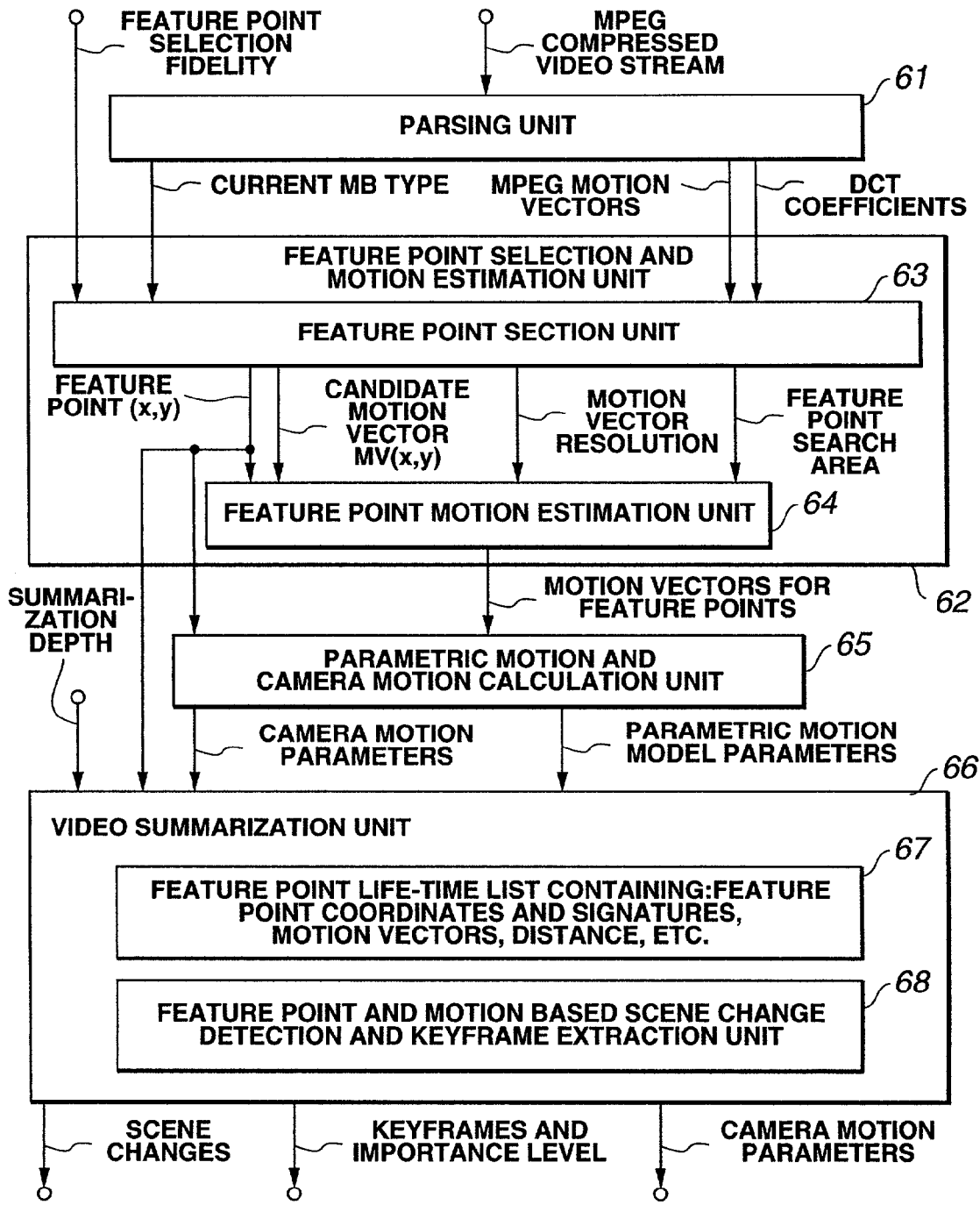
FIG. 6 shows a dataflow diagram of the metadata extraction unit.

FIG. 6 depicts the data-flow of the metadata extraction unit. The parsing unit 61 is responsible MPEG bitstream parsing, as well as DCT-coefficient and motion vector extraction, and is further described in FIG. 7. The parsing unit 61 supplies the type of the current macroblock (I: Intra, B: Bidirectional prediction, P: Prediction), the extracted MPEG motion vectors (if existent for this macroblock type) and the DCT-coefficients (if existent) for the current frame to the feature point selection unit and also to the motion estimation unit 62.

Figure 8:
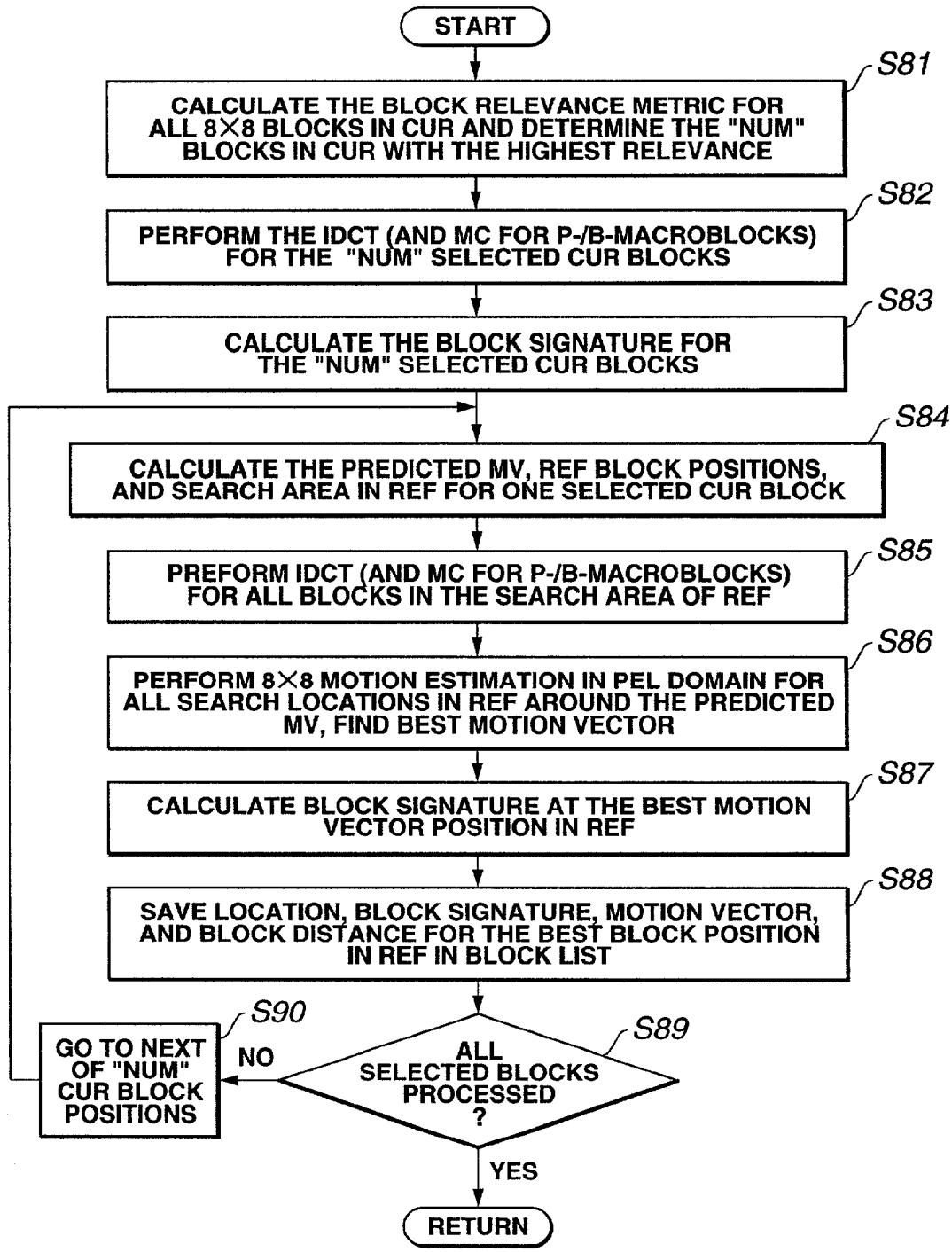
FIG. 8 shows the control flow of the feature point registration and motion estimation using an IDCT algorithm applied in selected blocks.

The feature point selection unit 63 is controlled by a feature point selection fidelity parameter. It calculates from these input data the feature point coordinates in the current frame and passes them to the feature point motion estimation unit 64, to the parametric and camera motion calculation unit 64 and to the video summarization unit 66. From the feature point selection unit 63, a candidate motion vector MV (x,y), the required motion vector resolution and the search area are passed to the feature point motion estimation unit 64. The control flow of the feature point selection and motion estimation is depicted in FIG. 8. The feature point motion estimation unit 64 calculates motion vectors from the feature point coordinates of the current frame as well as from the feature point coordinates of the reference frame and outputs these motion vectors to the parametric and camera motion calculation unit 65.

The parametric and camera motion calculation unit 65 takes the motion vectors from the previous step and calculates the parameters of a parametric motion model and the camera motion parameters, which are passed to the video summarization unit, 66.

The video summarization unit, 66 consists of the basic step of a feature-point life-time list 67 as well as of a feature point and motion based scene change detection and keyframe extraction unit 68.

Figure 12:
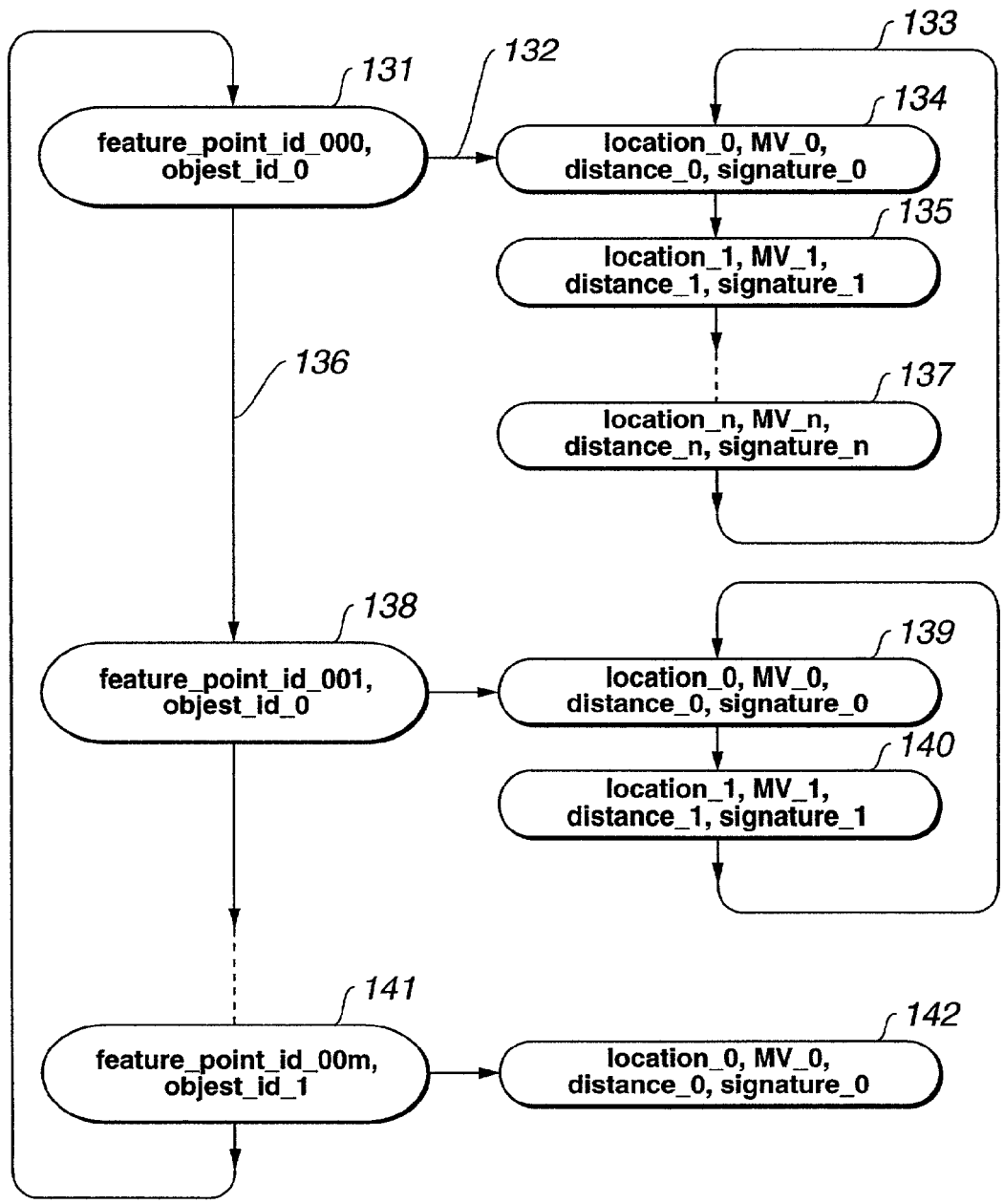
FIG. 12 shows the data-structure of the feature-point life-time list for video summarization.

The feature-point life-time list 67 contains feature point coordinates and signatures, motion vectors associated with the feature points and the distance measure calculated for the motion vectors, cf. FIG. 12 for example. The feature point and motion based scene change detection and keyframe extraction unit 68, delivers the frame numbers for scene changes, the keyframes with their corresponding importance level and the camera motion parameters as metadata to the video browsing unit, shown as 35 in FIG. 3.

The video summarization unit, 66 can be (optionally) externally controlled with respect to the depth of the summarization, i.e. the number of keyframes with their corresponding camera or parametric motion parameters.

Figure 7:
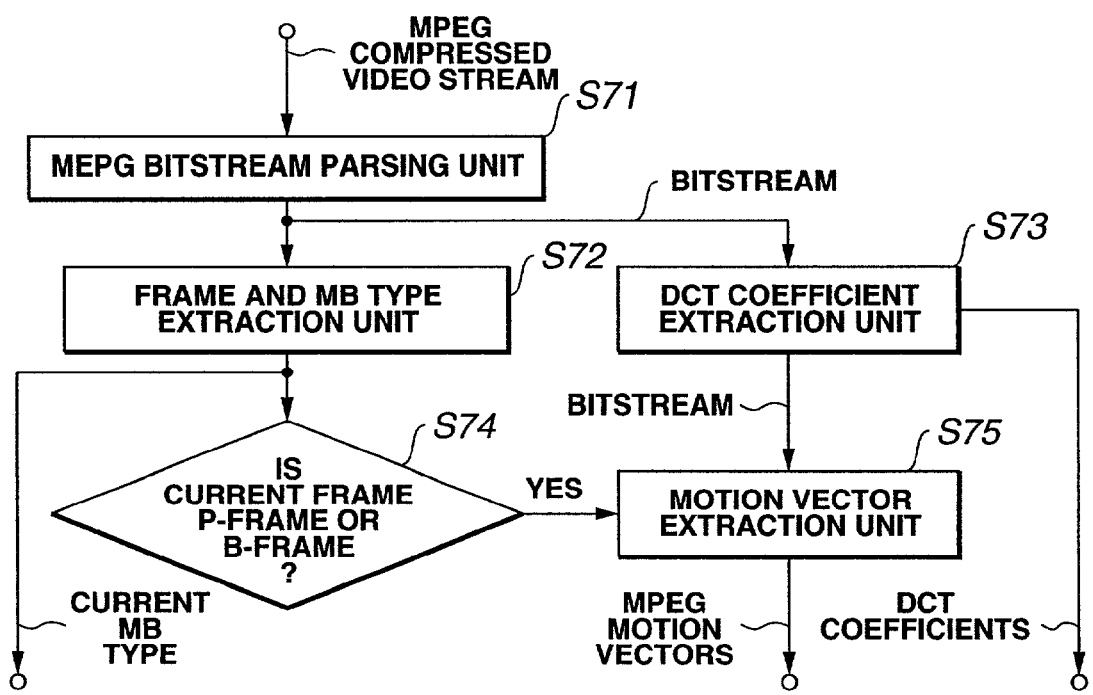
FIG. 7 illustrates the MPEG bitstream parsing, the DCT-coefficient extraction and the motion vector extraction unit.

FIG. 7 depicts the parsing unit, which consists of an MPEG bitstream parsing unit 71, which extracts the MPEG video bitstream for example from the MPEG transport stream. The frame and macroblock-type extraction unit 72, extracts the macroblock-type, and in case the current macroblock (MB) is a P-MB or B-MB (P-VOP or B-VOP respectively) 74, also the motion vectors are extracted for this macroblock (or VOP) using the motion vector extraction unit 75. From the preparsed bitstream, the DCT-coefficient extraction unit 73, extracts the DCT coefficients for Intra blocks in I-frames, P-frames or B-frames (or I-VOPs, P-VOPs or B-VOPs in MPEG-4).

FIG. 8 describes the feature point selection and motion estimation process using a IDCT (Inverse Discrete Cosine Transform) only on a selected number of blocks.

Full decoding of the MPEG stream (c.f. FIG. 1) requires 2×396×4=3168 IDCT calculations for cur and ref when the CIF format (352×288 pel) is used. However, for example, for camera motion estimation only 6 feature-points (num=6) in cur with associated motion vectors are necessary for e.g. a 6 parameter motion model. In this example, for each feature point one IDCT calculation in cur and 4 IDCT calculations in ref are required (=5×6=30 IDCT) when using a small [−4, +4] pel search area (e.g. around the predictor). This gives considerable advantages in terms of the required computational power for IDCT calculations by a factor of about 100. For large motion, the MPEG motion vector can be used also as predictor for the search area. A [−4, +4] pel search area is usually sufficient when using the MPEG motion vector as predictor. The search area, however, can be adaptively selected.

In FIG. 8, step S81 calculates the block relevance metric for all 8×8 blocks in the current frame, sorts these blocks according to their relevance and determines the number "num" of blocks in cur with the highest relevance. The calculation of the block relevance metric is explained in more detail in FIG. 9. Note, that only blocks in Intra-macroblocks can be selected as one of the "new" relevant points, while (once selected) a relevant point can be tracked through I-frames, P-frames, and B-frames. The preferred embodiment for step S81 is described in detail in FIG. 9.

In FIG. 8 step S82, the 8×8 block IDCT (and the MC, Motion Compensation, for blocks within a P-macroblock or B-macroblock) is calculated for the "num" selected cur blocks. The 8×8 block IDCT and MC calculation are methods known to the skilled in the art.

In FIG. 8, step S83 performs the block signature extraction for all "num" cur blocks, which were selected in step S81. For calculation of the block signature, there exist two preferred embodiments: a) calculation of the block signatures in the pel domain; and b) calculation of block signatures in the DCT domain are disclosed here. As the block signatures have to be calculated only for these "num" blocks in cur, which are already transformed in the pel domain by step S82, resulting in no significant additional computational overhead for the pel domain block signatures from this step.

As a simple pel domain block feature all or a selected number of pel of a block can be used as a signature and signature matching can be performed using the SAD (Sum of Absolute Differences), MSE (Mean Square Error) or other criteria such as the Haussdorf-distance known to the skilled in the art. However, as this is not very suitable in terms of representation efficiency, higher level block feature point signatures in the pel domain are representing preferred embodiments. These higher level signature features include: edge detection techniques like Canny (John Canny: A computational approach to edge detection: IEEE Transactions on Pattern Analysis and Machine Intelligence, vol. 8, no. 6, p 679-698, 1986), Sobel, Prewitt, as well as texture and color classifications, image registration techniques like Lucas/Kanade (Bruce D. Lucas and Takeo Kanade: An Iterative Image Registration Technique with an Application to Stereo Vision: International Joint Conference on Artificial Intelligence, pp 674-679, 1981), Marr/Hildreth (David Marr, Ellen Hildreth: Theory of edge detection: Proc. of the Royal Society of London B, vol. 207, pp. 187-217, 1980); or others which can be used together with their matching criteria and are preferred embodiments and known to the skilled in the alt.

For DCT-domain block signature calculation all or a selection of DCT-coefficients, FIG. 11, can be used for feature point registration. DCT-coefficients for the DCT-block signature can be taken from the luminance (Y) block only or —alternatively—also from the chroimance (U,V) DCT-block. Here only the usage of the DCT-coefficients of the luminance blocks is depicted, but the extension to chrominance blocks can be easily performed by the skilled in the art. Preferred embodiments include: a) D00, b) D00, D01, D02, D03; and c) all DCT coefficients, depending on the application scenario. Preferred embodiments for the distance calculation between the DCT-coefficients of $C_{hV}$ (the signature of the current DCT-block) and $D_{hV}$ (coefficients representing the signature of the DCT-block being compared with) include:

$$Distance = \sum_{h}^{hmax} \sum_{v}^{vmax} P_{hv} \cdot |C_{hv} - D_{hv}|$$

or $$Distance = \sum_{h}^{hmax} \sum_{v}^{vmax} P_{hv} \cdot (C_{hv} - D_{hv})^2$$

where (h=v=0 and hmax=vmax=7 for example) and each term can be optionally weighted by an weighting factor phv. With these parameters, the DCT-block signatures can be adapted to various applications, e.g. for image mosaicing from a video sequence, different h, v, hmax, vmax, phv values from that selected for video summarization or camera motion estimation might be chosen. For higher level DCT-block signatures, preferred embodiments include also DCT-block activity features, DCT-directional features, DCT-energy features, as described in "K. R. Rao. P. Yip: Discrete Cosine Transform—Algorithms, Advantages, Applications: Academic Press 1990" and in "Bo Shen, Ishwar K. Sethi: Direct feature extraction from compressed images: SPIE 2670, Storage & retrieval for Image and Video Databases IV, 1996" and are known to the skilled in the art.

In FIG. 8 step S84, the predicted motion vector (MV), the reference block position and the search area are calculated for the one selected cur block. The motion prediction scheme depends heavily on the application. For example, for camera motion extraction using a 6 parameter model, the location of the feature points in ref can be predicted from the affine motion model gained from previous frames. Similarly the motion of feature points can be predicted for object tracking. In case of P-macroblocks or B-macroblocks, the motion vectors extracted from the compressed MPEG bitstream can be used as the center of the search area in ref. In this case, and especially in the case of the MPEG motion vector being small, the search area can be selected small. This indicates that the IDCT decoding and motion compensation of only 4 blocks may be already sufficient. In case of Intra-macroblocks, it has to be determined by means of the DCT-block signature or the pel domain block signature if one or several of the blocks are new. In case the block is new, then a preferred embodiment is to set a larger search area, depending on the application.

In case the block signature exhibits that the block already exists in one or several distant frames, than from the motion vector history of the block list the next motion direction and search range can be determined by motion vector prediction methods known to the one skilled in the art. In FIG. 8 step S85 for all in step S84 calculated block positions in the I-reference frame/P-reference frame/B-reference frame the 8×8 block IDCT is calculated. The block positions are inside the in step S84 calculated search area with the center being the in step S84 calculated motion vector predictor. For P-reference macroblocks and B-reference macroblocks also the MC (Motion Compensation) is calculated.

The technique is the same as used in the MPEG-1/MPEG-2/MPEG-4 standard decoders and is known to those skilled in the art. Note that the IDCT (and MC in case of P-macroblock and B-macroblock) is applied not on the whole frame but only for the small search area in ref associated with the "num" blocks in cur and is therefore significantly faster than full decoding of a whole frame.

In FIG. 8 step S86, a 8×8 block motion estimation is performed in the pel domain for all search locations in ref within the search area around the predicted MV (both calculated in step S84), in order to find the best motion vector in the search area in ref for the selected block in cur. For the 8×8 motion estimation in the pel domain, preferred implementations include (but are not limited to) motion estimation methods like full search block matching, pel recursive search etc. known to the skilled in the art, c.f. "Peter Kuhn: Algorithms, Complexity Analysis and VLSI-Architectures for MPEG-4 Motion Estimation: Kluwer Academic Publishers, June 1999, ISBN 792385160". Note that for P-macroblocks/B-macroblocks the search area (and therefore the required computational power) can be very small, as the motion vector from the MPEG-bitstream is used as a motion vector predictor (however it is in most of the cases for 16×16 macroblocks and not always reliable). One of the preferred embodiments of the motion estimation unit is an implementation where the blocksize is not limited to 8×8, but can also cover variable blocksize motion estimation using such as 4×4 as well as 8×8 blocks. Another preferred embodiment of the motion estimation is an external controllable motion displacement resolution, which can be, for example, set to 1 pel, 2 pel or 0.5 pel and can be implemented by methods known to those skilled in the art. Note, that when using specific features, like for example Lucas/Kanade features it is preferable in terms of computational complexity and tracking fidelity to employ the Lucas/Kanade/Tomasi feature tracker within the calculated search area than performing block-matching motion estimation on these feature points.

In FIG. 8 step S87, the block signature for the block in ref pointed to by the motion vector of the best matching 8×8 block position (determined in step S86) is calculated by the same method as described in step S83. Note, that when using a DCT-block signature all the pel of the best matching 8×8 block position have to be transformed into the DCT-domain.

In FIG. 8 step S88, the block's location in cur (for which steps S84, S85, S86, S87 were just performed), the block signature calculated in step S87, the motion vector as well as the calculated distance (MSE: Mean Square Error, SAD: Sum of Absolute Differences, depending on the employed motion estimation algorithm) between the current and the reference block pointed to by the best motion vector (calculated in step S86) are saved in a data structure, a preferred embodiment is, for example, depicted in FIG. 12. In case the result of the distance calculation is above a threshold given by the application and the last "num" blocks are already being processed, one or more of the following strategies apply: increase the "num" blocks taken from the block relevance list or increase the search area of the motion estimation unit. This method allows to adapt to different content material and coding structures of the compressed video.

In FIG. 8, step S89 checks if all in step S83 determined "num" blocks are already processed. If all determined "num" blocks are already processed (YES), the feature point based motion estimation algorithm stops here for this frame, if not (NO) step S90 is entered.

In FIG. 8 step S90, the next one of the determined "num" block positions for which no motion estimation was performed so far is accessed and the loop including steps S84, S85, S86, S87, S88 is performed again.

Figure 9:
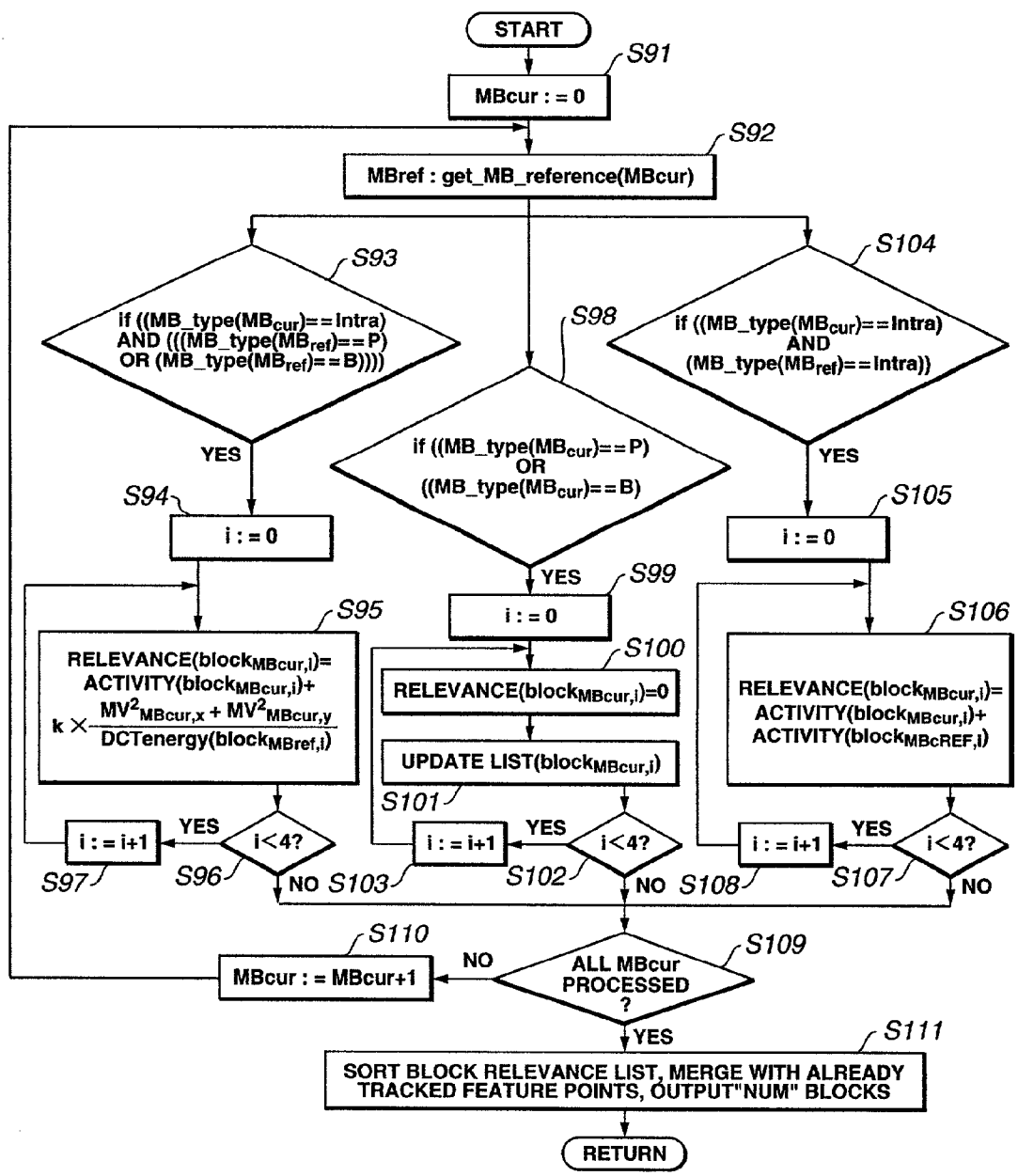
FIG. 9 shows the calculation flow of the block relevance metric.

In FIG. 9 a preferred embodiment of the calculation of the block relevance metric is depicted. The block relevance metric signals the suitability of a block for motion estimation or motion tracking, which is usually determined by (but not limited to) visual features like edges, color, or other significant textural gradients. When P-frames or B-frames are available, the motion information contained in the P-macroblocks and B-macroblocks of these frames can be used to help finding blocks depicting a high relevance.

In FIG. 9 step S91, the macroblock counter for the current frame, MBcur, is set to zero. This counter iterates over all macroblocks in the current frame regardless their macroblock-type (I-type, P-type or B-type).

In FIG. 9 step S92, the macroblock associated to MB cur, MBref in the reference frame is selected. If there is a motion vector for MBcur (this information is available, as we have access to the next encoded frames of the compressed bitstream), MBref is the macroblock the motion vector is associated with. If there is no motion vector (or a motion vector with zero length) for MBcur, then MBref has the same macroblock number as MBcur. The macroblock type for MBcur and MBref is also extracted from the compressed bitstream in this step.

In FIG. 9 step S93, a condition is tested. In case the macroblock type of MBcur is of Intra and MBref is a P-type or a B-type macroblock step S94 is entered.

In FIG. 9 step S98, another condition is tested. In case the macroblock type of MBcur is of P-type or MBcur is of B-type step S99 is entered.

In FIG. 9 step S104, another condition is tested. In case the macroblock type of MBcur is Intra and MBref is also Intra, step S105 is entered. Step S105 and subsequent steps handle all predictionless DCT-only coded MPEG formats as well as other formats like DV or MJPEG.

In FIG. 9 step S94, the block counter for the DCT-blocks inside a macroblock (FIG. 4) is set to zero and step S95 is entered.

In FIG. 9, step S95 depicts a preferred embodiment of the calculation of the relevance of the $block_{MBcur,i}$, where the Relevance of this 8×8 DCT block is defined as:

$$Relevance(block_{MBcur,i}) = Activity(block_{MBcur,i}) + k \times \frac{MV^2_{MBcur,x} + MV^2_{MBcur,y}}{DCTenergy(block_{MBref,i})}$$

and "k" is a weighting factor to be chosen according to the application and may be selected different for motion estimation (e.g. by block matching) than for tracking (e.g. by feature point tracking techniques like Lukas/Kanade/Tomasi). A preferred embodiment of the activity measure of the 8×8 block in the DCT domain is defined as follows, where $D_{hv}$ are the DCT-coefficients (FIG. 11):

$$Activity = \sum_{h}^{hmax} \sum_{v}^{vmax} |D_{hv}| \quad (h, v) \neq (0, 0)$$

The values of hmax=vmax are usually chosen to be 7 but may be chosen between (1 . . . 6) for a faster and more noise robust implementation. However, other DCT-activity or edge measures as defined in "K. R. Rao, P. Yip: Discrete Cosine Transform—Algorithms, Advantages, Applications: Academic Press 1990" and "Bo Shen, Ishwar K. Sethi: Direct feature extraction from compressed inages: SPIE 2670, Storage & retrieval for Image and Video Databases IV, 1996" represent also possible embodiments of the present invention. The DCTenergy is defined as:

$$DCTenergy = \sum_{h}^{hmax} \sum_{v}^{vmax} |D_{hv}|$$

Another preferred embodiment with reduced computational complexity is to set the DCT-energy term to 1 for every single relevance calculation or use only the sum (and not the squared sun) of the motion vectors.

In FIG. 9, step S96 and step S97 iterate the step S95 four times until all four blocks of the MBcur are processed.

In FIG. 9 step S99, the block counter for the blocks inside a macroblock (FIG. 4) is set to zero and step S100 is entered.

In FIG. 9 step S100, the relevance of this block is set to zero, as in a P-macroblock or B-macroblock, macroblock pels are predicted from previous (or also future frames in case of B-frames) and no new feature point can start here.

In FIG. 9 step S101, however, existing block feature points, which are already tracked from other frames, are still kept in the feature-point list of "num" current block feature points. Note, that for these feature-points in step S82 an IDCT and MC has to be performed, as the macroblock is of type P or B.

In FIG. 9, step S102 and step S103 iterate the step S100 and S101 four times until all four blocks of the MBcur are processed.

In FIG. 9 step S105 the block counter for the blocks inside a macroblock (FIG. 4) is set to zero and step S106 is entered.

In FIG. 9 step S106 calculates the block relevance for MBcur in case the current macroblock and the reference macroblock are Intra-macroblocks. The block relevance is calculated as:

$$Relevance(block_{MBcur,1}) = Activity(block_{MBcur,1}) + Activity(block_{MBref,i})$$

with $$Activity(block_{MBref,i}) = \sum_{k=0}^{kmax} M_k \times Activity(block_{MBref_k,i})$$

where the calculation of the Activity in the DCT-domain is stated as above. For the activity calculation of the corresponding block in the reference frame several activity measures of the corresponding and the neighboring kmax blocks are summarized and added to the activity of the current block. The activity of the neighboring blocks also gives an indication of the size of the search area for the subsequent motion estimation. The value kmax depends on the frame size as well as on application constraints. The value $m_k$ weights the activity of the distant reference DCT-blocks and is determined on application constraints, but $m_k$ is small and below one for the preferred embodiment, but can also be zero for an other (e.g. computationally more constrained) embodiment.

In FIG. 9, step S107 and step S108 iterate the step S106 four times until all four blocks of the MBcur are processed.

In FIG. 9, step S109 and S110 determine if all current macroblocks are already processed and iterate on all macroblocks of the frame MBcur.

In FIG. 9, step S111 concerns the sorting of the block relevance list, the merging with the already tracked feature points and the determination of the "num" blocks to be output. The blocks in MBcur are sorted in terms of their block relevance value and the best "num" feature points have to be determined. Sorting algorithms are known to the one skilled in the art. The number of feature points to be selected depends mainly on the target application. For example, for a 6 parameter camera motion estimation based on an affine 6 parameter model, 6 feature points with their associated motion vectors are required. Therefore in this case at least 6 blocks with high relevance have to be selected. For this example, the 6 blocks depicting the best relevance metrics are chosen. For video summarization, the number of selected blocks representing the feature points depends on the externally chosen fidelity parameter. For other applications, the upper number of feature points may be only limited by the number of 8×8 blocks in a picture. In case tracking of feature points result in only very short motion vectors (which are often distorted by noise), or the later motion estimation process results in insufficient results (i.e. a very high distance measure occurs), one of the preferred embodiments of the present invention is to select the next n feature points according to their relevance value until no further feature points are left. For feature point tracking applications, the new calculated block feature points with high relevance have to be merged with existing block features already tracked from distant frames.

The second preferred embodiment will now be described in detail.

Figure 10:
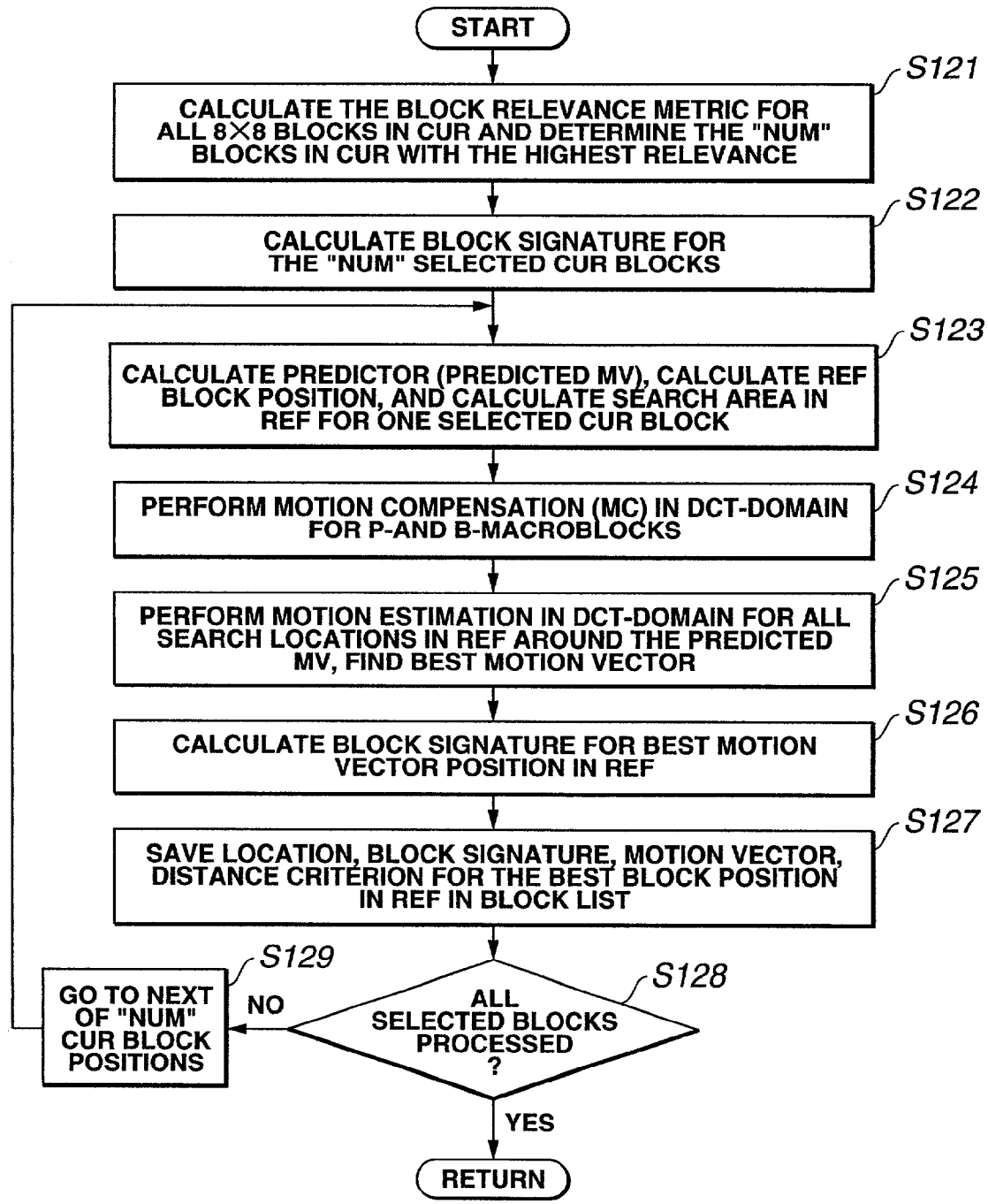
FIG. 10 depicts the control flow of the feature point selection and motion estimation in DCT-domain.

FIG. 10 depicts the second preferred embodiment of the invention using a DCT-based motion estimation. This method offers the advantage that no macroblocks for the current blocks or for the search area have to be transformed from the DCT-domain to the pel-domain by using the IDCT. However, in the case P-frames or B-frames are existent in the compressed video bitstream, motion compensation (MC) has to be performed in compressed domain, which may exhibit losses in terms of accuracy. DCT-based motion estimation across block boundaries may also introduce losses in terms of accuracy. The main applications of the second preferred embodiment of the invention are expected in the area of Intra-frame dominated video, as for the compressed bitstreams like DV, MJPEG and also Intra-frame only MPEG which is used frequently in the broadcast industry.

In FIG. 10 step S121, the block relevance metric for all 8×8 blocks in cur is calculated using the same method as described in FIG. 8 step S81.

In FIG. 10 step S122, the block signature for all selected "num" cur blocks is calculated. Basically both methods in DCT-domain as well as in the pel domain described in FIG. 8 step S83 are applicable. However, the block signature method in DCT-domain described in FIG. 10 step S122 offers the advantage that no IDCT is required for this step and the complete algorithm of FIG. 10 can be performed without any IDCT. However, for P-macroblocks and B-macroblocks motion compensation is required either in compressed domain or in the pel-domain.

In FIG. 10 step S123, the predicted motion vector, the calculated reference block position and the search area in ref are calculated using the same method as described in FIG. 8 step S84.

In FIG. 10 step S124, for P-macroblocks and B-macroblocks of the search area in ref, the motion compensation (MC) has to be calculated in DCT-compressed domain. One of several preferred embodiments are algorithms described by "Shih-Fu Chang, David G. Messerschmidt: Manipulation and Compositing of MC-DCT Compressed Video: IEEE Journal on Selected Areas in Comunication, vol. 13, no. 1, 1995" and in a refined version by "Yoshiaki Shibata, Zhigang Chen, Roy H. Campell: A fast degradation-free algorithm for DCT block extraction in the compressed domain: ICASSP 99, 1999".

In FIG. 10 step S125, the motion estimation is calculated in DCT-domain for all search locations in ref around the predicted motion vector. For the best search position, the value of the distance metric as well as the motion vector is saved. Preferred embodiments for the calculation of the motion estimation in the DCT-domain are listed for example in U.S. patent "U.S. Pat. No. 5,790,686: 8/1998: Ut-va Koc, K. J. Ray Liu: DCT-based motion estimation method: 382/107".

In FIG. 10 step S126, the block signature for the best motion vector position in ref is calculated. Basically both methods in DCT-domain as well as in the pel domain described in FIG. 10 step S122 are applicable. However, the block signature method in DCT-domain as described in FIG. 8 step S83 offers the advantage that no IDCT is required for this step and the complete algorithm depicted in FIG. 10 can be performed without any IDCT. The block signature method in pel-domain requires only two IDCT, one for each of the "num" current blocks and another for the best displaced block of the compressed domain motion estimation, which is computationally still very small.

In FIG. 10 step S127, the location, the block signature, the motion vector, and the distance criterion for the best block position in ref are saved in the block list. In case the result of the distance calculation is above a threshold given by the application and the last "num" block is already being processed, one or more of the following strategies apply: increase the "num" blocks taken from the block relevance list or increase the search area of the motion estimation unit. This method allows to adapt to different content material and coding structure of the compressed video.

In FIG. 10 step S128 and step S129, the next one of the determined "num" block positions for which no motion estimation was performed so far is accessed and the loop including steps S123, S124, S125, S126, S127, is performed again.

The third preferred embodiment will now be described in detail.

Another preferred embodiment of the invention is video summarization. This is realized by keeping a life-time list of the feature points (which can be distinguished by their feature point signature) and their associated locations in the frame, their motion vectors, their distance (of the motion vector calculation) and their signature. In case a high number of new feature points emerge in a new frame, then there is a high probability of a scene change. Similarly, when a high number of feature points disappear from one frame to the next frame, then this might be with a high probability also a scene change. Keyframes are selected in such frames for a scene, where a high number of feature-points exists and the overall amount of motion is low.

FIG. 12 depicts the preferred embodiment of the data-structure of the feature-point life time list for video summarization. There exists a linked list for every feature point, which is given a feature_point_id for uniquely marking it, as depicted by 131, 138, and 141. The feature_point_id data-structure contains also an object_id field to associate one or several feature points with objects. These feature_point_ids are connected using pointers as a linked list, 136. Every feature_point_id points to an other list of time instances of each feature point in the video-stream (e.g. 132), where each entry contains a data for the spatio-tenporal location of this feature point (e.g. 134, 135, and 137) at a particular time instance (e.g. location_0=(x,y), time), data for the motion-vector (e.g. MV_0=(MV$_x$, MV$_y$)) of this feature-point at a specific time instance to the same feature point at the next time instance, the distance value of the feature point motion vector calculation (distance_0) for the determination of the reliability of the motion vector, and the signature of the feature point (signature_0) to associate the right feature points under the same feature_point_id. Note that for some implementations, some of these data-fields may be optional or others may be required.

The time instances of the feature points are also connected by a linked list, where linking the last entry with the first entry allows for example functionalities like playing again and again a part of a video, where objects (containing numerous feature-points) or specific motion patterns appear. For these linked lists, there exist mechanisms for removing feature_point_ids based on their time since their disappearing in a scene. There also exist mechanisms for adding new feature_point_ids, which uses the distance of the feature-points in the signature space. This distance in the signature space determines, if this is a new feature-point or one to be associated with an existing one. Other mechanisms for adding new feature_point_ids to an existing object include their spatial distance from this object. From the motion vectors contained in the feature-fields of one feature_point_id, motion trajectories over time for this feature point can be constructed as known to the skilled in the art (e.g. by but not limited to Kalman-filters or Lucas/Kanade/Tomasi feature tracking).

The motion vectors of several feature_point_ids grouped to one object_id (grouping can be done for example based on the signature and their spatial distance of their locations) can be used to calculate the parametric motion of the object identified by the feature_point_ids, as known to the skilled in the art. In case an object is chosen as the rectangular background frame, this linked list methodology can be similarly used to represent camera motion, which is explained in more detail in the next preferred embodiment.

The fourth preferred embodiment will now be described in detail.

Figure 13:
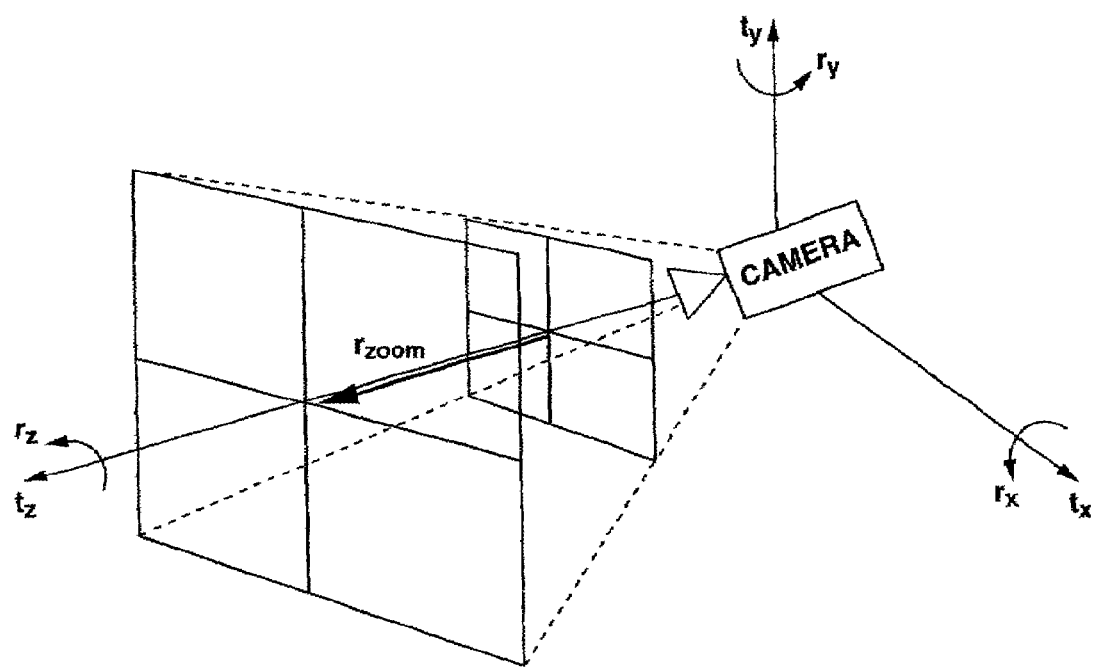
FIG. 13 illustrates the camera motion directions.

FIG. 13 depicts possible motion directions of a camera, which include zoom, rotation in three directions as well as translation in three directions. One of the preferred embodiments of the invention is to use the extracted motion metadata, which is contained in the data-structure in FIG. 12, to calculate the camera motion like zoom, pan, tilt, etc for a video sequence in compressed domain. The fast and efficient calculation of camera motion is useful, for example, for efficient video browsing (show keyframes and their associated camera motion), video editing (e.g. cut the video at the frame where the zoom out ends), and facilitating the transcoding from one compressed representation (e.g. MPEG-2) to another compressed representation (e.g. MPEG-4).

To extract the camera motion parameters based on the feature point motion vectors obtained in FIG. 6, 62, one of the preferred embodiments is the use of a camera motion model (M. V. Srinivasan, S. Venkatesh, R. Hosi: Qualitative estimation of camera motion parameters from video sequence: Pattern recognition, Elsevier, vol. 30, no. 4, 1997, pp 593-606) together with it's camera motion parameter extraction method:

$$u_x = -r_y + Y \cdot r_z + X \cdot r_{zoom}$$

$$u_y = r_x - X \cdot r_z + Y \cdot r_{zoom}$$

In this algorithm a synthetic motion vector field described by the above equations for the each motion vector ($u_x$, $u_y$) is calculated based on parameters for $r_x$, $r_y$, $r_z$, and $r_{zoom}$ where X and Y are pel coordinates in the image plane. Then the actual vector field (which is provided by FIG. 6, step 62) is subtracted from the calculated synthetic vector field and the parallelism of the residual motion vector field is evaluated. The residual motion vector field represents the translational component of the camera motion. The optimum parameters for $t_x$, $r_y$, $r_z$, and $r_{zoom}$ are found when all motion vectors of the residual motion vector field are parallel. The algorithm performs for example a four-dimensional Simplex minimization by varying the parameters $r_x$, $r_y$, $r_z$ and $r_{zoom}$ until the best approximate parallelism of the residual (translatoric) motion vectors is obtained. However, other methods known to the skilled in the art to determine the parametric motion model for camera or object motion from the motion vectors are also possible.

Figure 14:
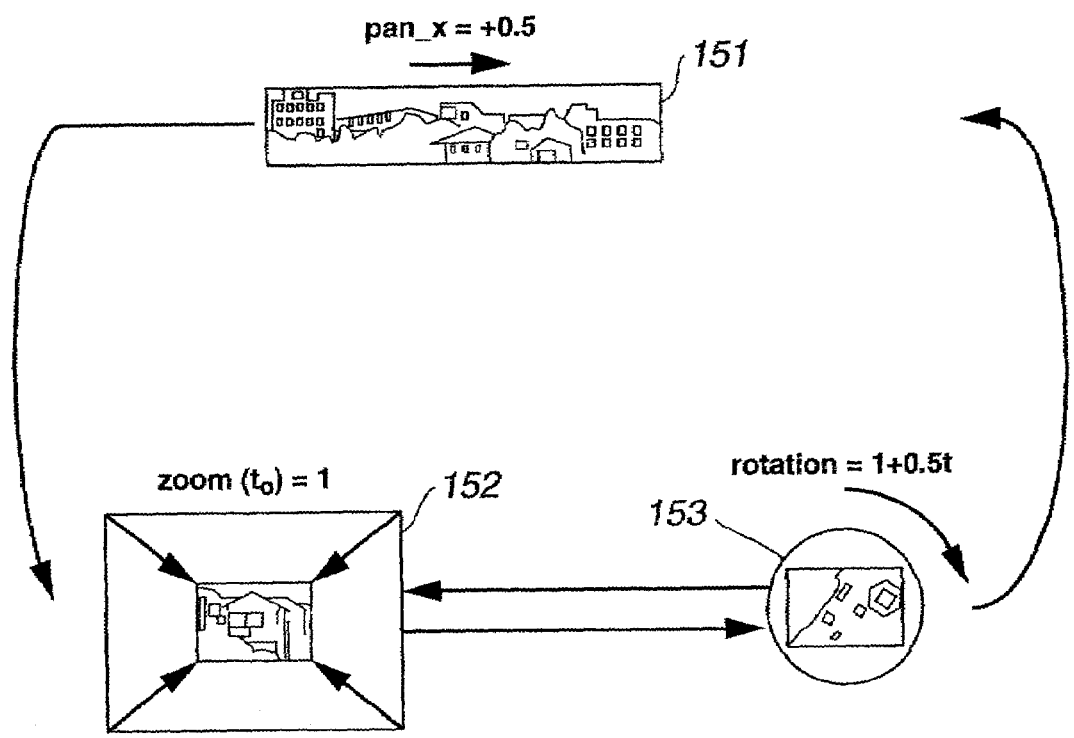
FIG. 14 gives an overview on an example of the video browsing unit.

FIG. 14 depicts an overview on the example of a graphical representation of the video browsing unit. This video browsing unit (or video browsing user interface) employs motion information (i.e. metadata), especially camera motion metadata to enable hierarchical decomposition and video summarization on shot and keyframe level. A shot is defined in this context as a sequence of video frames captured by one camera in a single continuous action in time and space. The present invention is general and this video browser is not restricted to camera motion but covers motion and scene related general metadata like parametric object motion. The present invention is not restricted on rectangular frames, but can be also applied to the browsing of arbitrarily shaped objects associated with their motion metadata. In the following example, the video browsing unit is described for the camera motion and the rectangular object case without loss of generality. For video browsing a model of a hierarchical camera motion state transition graph is applied.

Segments of similar motion metadata are first identified by gradient and clustering techniques known to the skilled in the art. A collection of key frames is derived from these and used to represent each video segment. The camera motion transition arcs between the key frames from each segment are described by camera motion parameters which are visually represented within the browser. The amount of camera motion is depicted in the video browser to enable the user to visually distinguish between small and large camera motion, or to distinguish between slow and fast camera zoom.

FIG. 14 depicts, for example, the case with three motion metadata states: camera pan, camera zoom and camera rotation.

FIG. 14 step 151 describes the camera pan state with a constant camera pan of 0.5 in x direction. The arrow depicts the direction of the camera pan motion and its length the relative speed of the camera motion. One of the preferred graphical representations for the camera pan is a mosaic representation of the successive frames containing camera pan. The generation of a mosaic representation is known to the one skilled in the art, "M. Irani, P. Anandan, J. Bergen, R. Kumar, S. Hsu: Efficient representations of video sequences and their applications: Signal Processing, Image Communications, vol. 8, 1996".

FIG. 14 step 152 describes a preferred embodiment of a graphical representation of the camera zoom state in the state transition graph, where at time "to" a camera zoom of 2 occurs. The thumbnail (i.e. keyframe) in the camera zoom representation depicts the center of the camera zoom. The length of the arrows in the camera zoom window represent the relative camera zoom speed. The direction of the arrows to the center represents zoom. The direction of the arrows out of the center represents zoom out.

FIG. 14 step 153 depicts a preferred embodiment of a graphical representation of camera rotation, where the thumbnail in the icon represents a representative frame of the focus of the camera rotation. The arrow depicts the direction of the rotation and the length of the arrow represents the relative speed of the camera rotation.

Each camera motion icon represents a specific camera motion state and the arrows between the camera motion icons represent camera motion state transitions between the specific camera motion states. Transition can be simply found by, for example, gradient techniques or thresholding the amount of each type of camera motion between successive frames. However, more advanced algorithms also can be applied as known to the one skilled in the art. The center of zoom is determined by the intersection point of all the (artificially prolonged) motion vectors.

Figure 15:
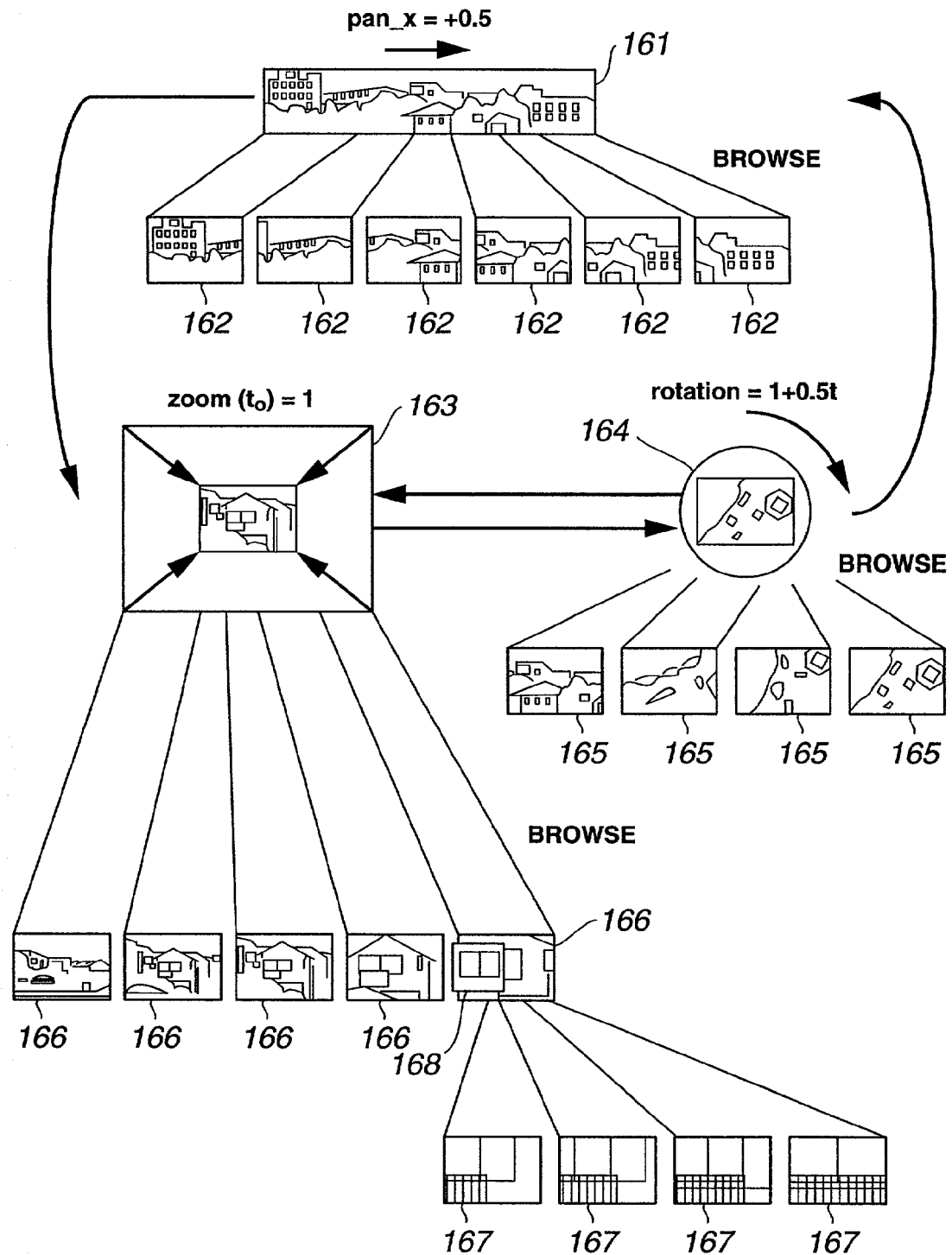
FIG. 15 shows the video browsing unit with camera pan, zoom and rotation keyframes examples.

FIG. 15 depicts an expanded view of the video browsing unit presented in FIG. 14. One of the preferred functionalities is a BROWSE command (preferred embodiments are clicking with a mouse, hitting a function key or a touchpen) on one of the three state icons (161, 163, 164) which results in showing a more detailed representation. When giving a BROWSE command to the pan state window 161, a keyframe representation of the camera pan is shown as 162. When giving a BROWSE command to the zoom state window 163, a keyframe representation of the camera zoom is shown as 166. In 166, one part of the keyframes 168 is visually marked (a preferred embodiment would be a frame in a square shape with different color around the zoom center of focus area). When a command (preferred embodiments are clicking with a mouse or a touch-pen) to this coloured frame is given, the next lower hierarchy level of the same motion metadata is graphically represented as 167. When a BROWSE command to the rotation state window 164 is given, a keyframe representation of the camera pan is shown as 165. Another preferred embodiment of functionality includes a PLAY command (preferred embodiments are double clicking with a mouse, hitting a function key or a touch-pen) on one of the three state icons (161, 163, 164) or the keyframe representations (162, 165, 166, 167): the part of the video sequence depicting this specific metadata (specifically camera motion in this example). This results in playing of the part of the video sequence which belongs to this state.

Figure 16:
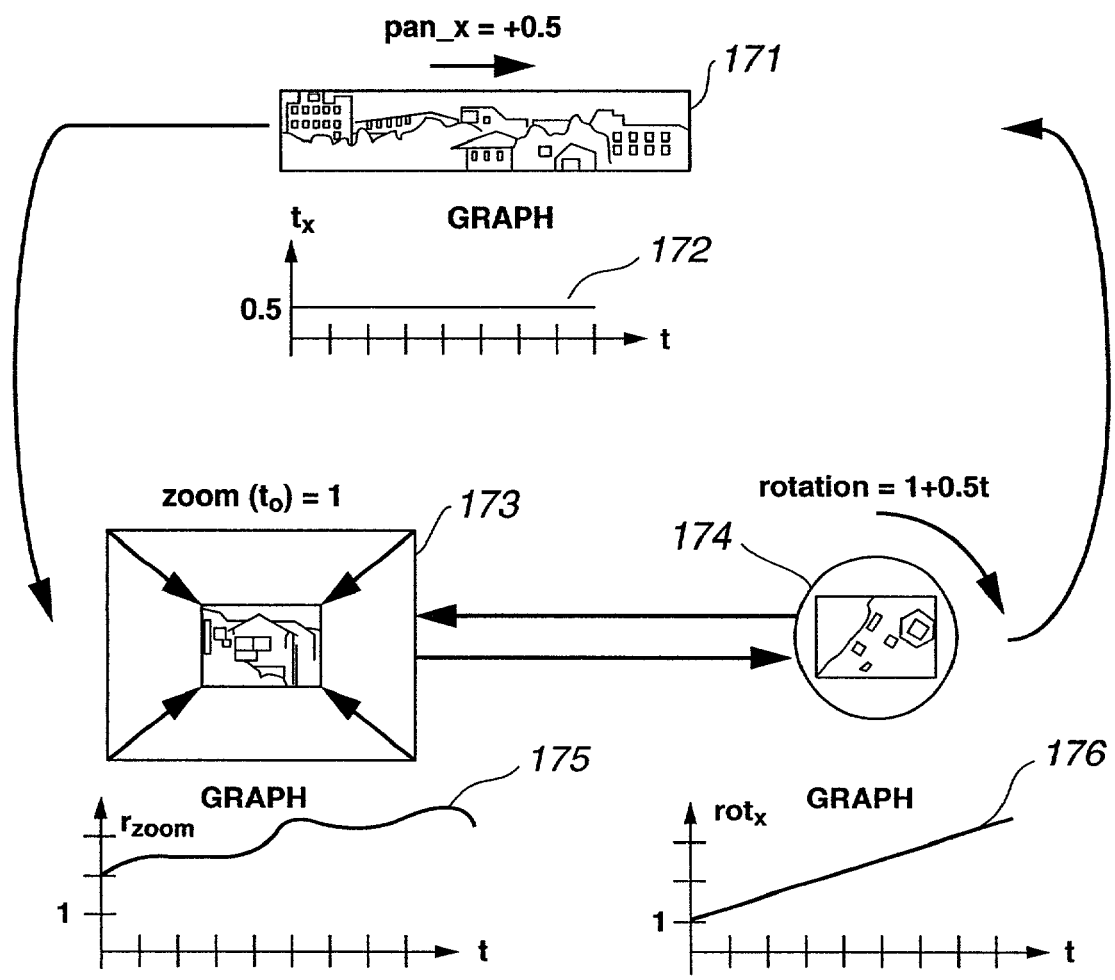
FIG. 16 gives a graph representation of the video browsing unit.

FIG. 16 depicts another preferred embodiment of functionality of the video browsing unit, when a GRAPH command (preferred embodiments are clicking with a mouse-button, function key or a touch pen) is given on one of the three state icons (171, 173, 174) or their subordinated keyframe representations (cf. FIG. 15) a graphical representation of the metadata (preferred embodiment: camera motion metadata along the time/frame number axis) is shown.

INDUSTRIAL APPLICABILITY

As has been described in detail, a video/audio signal processing method according to the present invention is adapted for processing supplied video/audio signals. The apparatus comprises the steps of: extracting at least one compressed domain feature point representing characteristics of the video/audio signals in a compressed domain of the video/audio signals; performing motion estimation of the feature points extracted by the extraction step; and tracking the feature points associated with a motion vector through a pre-set number of frames constructing the video/audio signals.

Thus, in the video/audio signal processing method according to the present invention, feature points of the video/audio signals are extracted in a compressed domain, motion estimation of the extracted feature points is performed, and the feature points associated with a motion vector are tracked, so that reduction of time or cost for processing can be realized and it makes it possible to process effectively.

Also, a video/audio signal processing apparatus according to the present invention is adapted for processing supplied video/audio signals. The apparatus comprises means for extracting at least one compressed domain feature point representing characteristics of the video/audio signals in a compressed domain of the video/audio signals; means for performing motion estimation of the feature points extracted by the extraction means; and means for tracking the feature points associated with a motion vector through a pre-set number of frames constructing the video/audio signals.

Thus, in the video/audio signal processing apparatus according to the present invention, feature points of the video/audio signals are extracted by the means for extracting compressed domain feature points in a compressed domain, motion estimation of the extracted feature points is performed by the means for performing motion estimation of the feature points, and the feature points associated with a motion vector are tracked by the means for tracking the feature points, so that reduction of time or cost for processing can be realized and it makes it possible to process effectively.

Further, a video/audio signal processing method is adapted for processing and browsing supplied video/audio signals. The method comprises the steps of: building hierarchically a camera motion transition graph, wherein the graph building step includes the step of providing a graph layout having at least one main camera motion transition graph and having a plurality of nodes representing other camera motion with the transition paths illustrated for a video sequence; browsing through the camera motion transition graph by depicting keyframes of a camera motion video sequence at the nodes; and browsing through the camera motion transition graph by depicting a graph representation of the camera motion at the nodes.

Thus, in the video/audio signal processing method according to the present invention, a camera motion transition graph is built hierarchically, browsing through the camera motion transition graph by depicting keyframes of a camera motion video sequence at the nodes is carried out, and browsing through the camera motion transition graph by depicting a graph representation of the camera motion at the nodes is carried out, so that reduction of time or cost for processing can be realized and it makes it possible to process effectively.

Furthermore, a video/audio signal processing apparatus according to the present invention is adapted for processing and browsing supplied video/audio signals. The apparatus comprises: means for building hierarchically a camera motion transition graph, wherein the graph building means includes the step of providing a graph layout having at least one main camera motion transition graph and having a plurality of nodes representing other camera motion with the transition paths illustrated for a video sequence; means for browsing through the camera motion transition graph by depicting keyframes of a camera motion video sequence at the nodes; and means for browsing through the camera motion transition graph by depicting a graph representation of the camera motion at the nodes.

Thus, in the video/audio signal processing apparatus according to the present invention, a camera motion transition graph is built hierarchically by the means for building graph, browsing through the camera motion transition graph by depicting keyframes of a camera motion video sequence at the nodes is carried out by the first means for browsing, and browsing through the camera motion transition graph by depicting a graph representation of the camera motion at the nodes is carried out by the second means for browsing, so that reduction of time or cost for processing can be realized and it makes it possible to process effectively.

Also, a video/audio signal processing method according to the present invention is adapted for extracting a hierarchical decomposition of a complex video selection for browsing. The method comprises the steps of: identifying video; collecting key frames from the video shots for representing each video segment; classifying the collections of key frames according to camera motion or global motion information; and building a graphical representation of the video, the graphical representation being based upon the results of the classifying step, temporal as well as camera motion information associated with each part of a video shot, wherein the graphical representation building step includes the step of representing each category of video shot by node.

Thus, in the video/audio signal processing method according to the present invention, video is identified, key frames are collected from video shots, the collected key frames are classified, and a graphical representation of the video is built, so that reduction of time or cost for processing can be realized and it makes it possible to process effectively.

Further, a video/audio signal processing apparatus according to the present invention is adapted for extracting a hierarchical decomposition of a complex video selection for browsing. The apparatus comprises: means for identifying video; means for collecting key frames from the video shots for representing each video segment; means for classifying the collections of key frames according to camera motion or global motion information; and means for building a graphical representation of the video, the graphical representation being based upon the results of the classifying step, temporal as well as camera motion information associated with each part of a video shot, wherein the graphical representation building step includes means for representing each category of video shot by node.

Thus, in the video/audio signal processing apparatus according to the present invention, video is identified by the means for identifying video, key frames are collected from video shots by the means for collecting key frames, the collected key frames are classified by the means for classifying, and a graphical representation of the video is built by the means for building a graphical representation of the video, so that reduction of time or cost for processing can be realized and it makes it possible to process effectively.

Moreover, a video/audio signal processing method according to the present invention is adapted for processing supplied video/audio signals. The method comprises the steps of: extracting at least one compressed domain feature point representing characteristics of the video/audio signals in a compressed domain of the video/audio signals.

In the video/audio signal processing method according to the present invention, feature points of video/audio signals are extracted in a compressed domain, so that reduction of time or cost for processing can be realized and it makes it possible to process effectively.

Also, a video/audio signal processing apparatus according to the present invention is adapted for processing supplied video/audio signals. The apparatus comprises: means for extracting at least one compressed domain feature point representing characteristics of the video/audio signals in a compressed domain of the video/audio signals.

Thus, in the video/audio signal processing apparatus according to the present invention, feature points of the video/audio signals are extracted in a compressed domain by the means for extracting compressed domain feature points, so that reduction of time or cost for processing can be realized and it makes it possible to process effectively.

Further, a video/audio signal processing method according to the present invention is adapted for processing supplied video/audio signals. The method comprises the steps of: performing motion estimation of at least one feature point representing characteristics of the video/audio signals in a compressed domain of the video/audio signals.

Thus, in the video/audio signal processing method according to the present invention, motion estimation of the extracted feature point is performed, so that reduction of time or cost for processing can be realized and it makes it possible to process effectively.

Moreover, a video/audio signal processing apparatus according to the present invention is adapted for processing supplied video/audio signals. The apparatus comprises: means for performing motion estimation of at least one feature points representing characteristics of the video/audio signals in a compressed domain of the video/audio signals.

Thus, in the video/audio signal processing apparatus according to the present invention, motion estimation of the extracted feature points is performed by the means for performing motion estimation, so that reduction of time or cost for processing can be realized and it makes it possible to process effectively.

The invention claimed is:

1. A video/audio signal processing method for processing supplied compression-encoded video/audio signals, said method comprising the steps of:
    parsing said video/audio signals in a compressed domain of the video/audio signals and extracting therefrom motion vectors of said video/audio signals, DCT-coefficients and macroblock-type;
    using said extracted motion vectors, DCT-coefficients and macroblock-type to extract at least one compressed domain feature point representing characteristics of said video/audio signals in a compressed domain of said video/audio signals;
    performing motion estimation of the extracted feature points;

tracking the feature points associated with a motion vector through a pre-set number of frames of said video/audio signals; and calculating and extracting the block signature for the current block of high relevance as selected in a discrete-cosine-transform domain using part or all of DCT-coefficients in a block, wherein said extraction step includes a step of calculating the block relevance metric of all blocks according to said DCT-coefficients in the current frame to determine a block having high relevance as a candidate of the feature point selected as the next feature point based on said motion estimation step, wherein said extraction step includes a step of performing inverse transform of transforming said compressed domain only for the blocks of high relevance selected by said metric calculating step and of performing motion compensation for a prediction coded macroblock or a bidirectionally prediction coded macroblock.

2. The video/audio processing method according to claim 1, wherein said inverse transform is inverse discrete cosine transform.

3. The video/audio processing method according to claim 2 including calculating a block signature for the current block of high relevance as selected in a pel domain.

4. The video/audio processing method according to claim 2, wherein said block relevance metric calculating step calculates a block relevance metric in the case when the current macro-block is an intra-type macroblock and the reference macroblock is a prediction coded macroblock or a bidirectionally prediction coded macroblock, said block relevance metric being calculated using a relevance measure as found based on the motion vector and the prediction error energy for an associated block by taking into account the reference macroblock.

5. The video/audio processing method according to claim 2 including setting the block relevance metric to zero in the case when the current macroblock is a prediction coded macroblock or a bidirectionally prediction coded macroblock; and updating the list of already tracked feature points from the reference frame.

6. The video/audio processing method according to claim 2 including calculating a block relevance metric in the case when the current macro-block is an intra-coded macroblock and the reference macro-block is also an intra-coded macroblock, said block relevance metric being calculated using a relevance measure as found based on the DCT activity from a block in the current macroblock and on the DCT activity as found by taking into account the reference macroblock.

7. The video/audio processing method according to claim 6, wherein said estimated camera motion is used to facilitate a transcoding process between one compressed video representation into an other compressed video representation.

8. The video/audio processing method according to claim 1, wherein said current frame includes an arbitrarily shaped video object plane.

9. The video/audio processing method according to claim 1 including calculating and extracting a block signature for the current block of high relevance as selected in a discrete cosine transform domain using part or all of individually weighted discrete cosine transform coefficients in a block.

10. The video/audio processing method according to claim 1, wherein said motion estimation step includes a step of calculating an estimated motion vector, the position of a reference block and a search area in a reference frame.

11. The video/audio processing method according to claim 10 including applying inverse transform of transforming said compressed domain to all blocks in an intra-macroblock in a search area of a reference frame.

12. The video/audio processing method according to claim 11, wherein said inverse transform is inverse discrete cosine transform.

13. The video/audio processing method according to claim 12 including performing inverse IDCT and motion compensation on all blocks in a prediction coded macroblock or in a bidirectional prediction coded macroblock in a search area of a reference frame.

14. The video/audio processing method according to claim 10, wherein said motion estimation step and said feature point tracking step include a step of performing motion prediction or feature point tracking in a pel area for all search locations in the reference frame around the predicted motion vector in order to find the best motion vector which depicts the lowest distance of the current block to the reference block in terms of the sum of absolute error, mean square error or any other distance criteria.

15. The video/audio processing method according to claim 14, wherein said motion estimation block performs motion estimation with variable block sizes.

16. The video/audio processing method according to claim 14 including saving as a feature point list a feature point location, a block signature, a motion vector and the block distance for the best block position in a reference frame.

17. The video/audio processing method according to claim 10, wherein said motion estimation block and said feature point tracking step include:

a step of performing motion estimation or feature point tracking in a discrete cosine transform domain for all search locations in the reference frame around the predicted motion vector in order to find the best motion vector which depicts the lowest distance of the current block to the reference block in terms of sum of absolute errors, mean square errors or any other distance criteria; and a step of calculating the block signature in the DCT domain of the block having said best motion vector position.

18. The video/audio processing method according to claim 17 including saving the feature point location, the block signature, motion vector and the block distance for the best block position in a reference frame as a feature point list.

19. The video/audio processing method according to claim 1, wherein the motion vector and the block signature for all relevant current blocks are determined.

20. The video/audio processing method according to claim 1, wherein the video/audio signals are compression-encoded in accordance with MPEG1, MPEG2, MPEG4, DV, MJPEG, ITU-T recommendations H.261 or H.263.

21. The video/audio processing method according to claim 1, wherein the extracted feature points are used along with metadata associated with these feature points for object motion estimation.

22. The video/audio processing method according to claim 1, wherein the extracted feature points are used along with metadata associated with these feature points for estimating the camera motion.

23. The video/audio processing method according to claim 1, wherein the extracted feature points are used along with metadata associated with these feature points for calculating a motion activity model for video.

24. A video/audio signal processing apparatus for processing supplied compression-encoded video/audio signals, comprising:
means for parsing said video/audio signals in a compressed domain of the video/audio signals to extract therefrom motion vectors of said video/audio signals, DCT-coefficients and macroblock-type;
extraction means for using said extracted motion vectors, DCT-coefficients and macroblock-type to extract at least one compressed domain feature point representing characteristics of said video/audio signals in a compressed domain of said video/audio signals;
means for performing motion estimation of the extracted feature points;
means for tracking the feature points associated with a motion vector through a pre-set number of frames of said video/audio signals; and
calculating and extraction means for calculating and extracting the block signature for the current block of high relevance as selected in a discrete-cosine-transform domain using part or all of DCT-coefficients in a block,
wherein said extraction means calculates the block relevance metric of all blocks according to said DCT-coefficients in the current frame to determine a block having high relevance as a candidate of the feature point selected as the next feature point based on said motion estimation step,
wherein said extraction means includes means for performing inverse transform of transforming said compressed domain only for the blocks of high relevance selected by said metric calculating means and of performing motion compensation for a prediction coded macroblock or a bidirectionally prediction coded macroblock.

25. The video/audio processing apparatus according to claim 24, wherein said inverse transform is inverse discrete cosine transform.

26. The video/audio processing apparatus according to claim 25, wherein said extraction means calculates and extracts a block signature for the current block of high relevance as selected in a discrete cosine transform domain using part or all of discrete cosine transform coefficients in a block.

27. The video/audio processing apparatus according to claim 25, wherein said extraction means calculates and extracts a block signature for the current block of high relevance as selected in a discrete cosine transform domain using part or all of individually weighted discrete cosine transform coefficients in a block.

28. The video/audio processing apparatus according to claim 25, wherein said extraction means calculates a block signature for the current block of high relevance as selected in a pel domain.

29. The video/audio processing apparatus according to claim 25, wherein said block relevance metric calculating means calculates a block relevance metric in the case when the current macro-block is an intra-type macroblock and the reference macroblock is a prediction coded macroblock or a bidirectionally prediction coded macroblock, said block relevance metric being calculated using a relevance measure as found based on the motion vector and the prediction error energy for an associated block by taking into account the reference macroblock.

30. The video/audio processing apparatus according to claim 25, wherein said extraction means sets the block relevance metric to zero in the case when the current macroblock is a prediction coded macroblock or a bidirectionally prediction coded macroblock and updates the list of already tracked feature points from the reference frame.

31. The video/audio processing apparatus according to claim 25, wherein said extraction means calculates a block relevance metric in the case when the current macro-block is an intra-coded macroblock and the reference macro-block is also an intra-coded macroblock, said block relevance metric being calculated using a relevance measure as found based on the DCT activity from a block in the current macroblock and on the DCT activity as found by taking into account the reference macroblock.

32. The video/audio processing apparatus according to claim 24, wherein said current frame includes an arbitrarily shaped video object plane.

33. The video/audio processing apparatus according to claim 24, wherein said motion estimation means calculates an estimated motion vector, the position of a reference block and a search area in a reference frame.

34. The video/audio processing apparatus according to claim 33, wherein said motion estimation means applies inverse transform of transforming said compressed domain to all blocks in an intra-macroblock in a search area of a reference frame.

35. The video/audio processing apparatus according to claim 34, wherein said inverse transform is inverse discrete cosine transform.

36. The video/audio processing apparatus according to claim 35, wherein said motion estimation means performs IDCT and motion compensation on all blocks in a prediction coded macroblock or in a bidirectional prediction coded macroblock in a search area of a reference frame.

37. The video/audio processing apparatus according to claim 33, wherein said motion estimation means and said feature point tracking means performs motion prediction or feature point tracking in a pel area for all search locations in the reference frame around the predicted motion vector in order to find the best motion vector which depicts the lowest distance of the current block to the reference block in terms of the sum of absolute error, mean square error or any other distance criteria.

38. The video/audio processing apparatus according to claim 37, wherein said motion estimation block performs motion estimation with variable block sizes.

39. The video/audio processing apparatus according to claim 37, wherein said motion estimation means and said feature point tracking means saves a feature point location, a block signature, a motion vector and the block distance for the best block position in a reference frame as a feature point list.

40. The video/audio processing apparatus according to claim 33, wherein said motion estimation block and said feature point tracking means performs motion estimation or feature point tracking in a discrete cosine transform domain for all search locations in the reference frame around the predicted motion vector in order to find the best motion vector which depicts the lowest distance of the current block to the reference block in terms of sum of absolute errors, mean square errors or any other distance criteria to calculate the block signature in the DCT domain of the block having said best motion vector position.

41. The video/audio processing apparatus according to claim 40, wherein said motion estimation block and said feature point tracking means saves the feature point location, the block signature, motion vector and the block distance for the best block position in a reference frame as a feature point list.

42. The video/audio processing apparatus according to claim 24, wherein the motion vector and the block signature for all relevant current blocks are determined.

43. The video/audio processing apparatus according to claim 24, wherein the video/audio signals are compression-encoded in accordance with MPEG1, MPEG2, MPEG4, DV, MJPEG, ITU-T recommendations H.261 or H.263.

44. The video/audio processing apparatus according to claim 24, wherein the extracted feature points are used along with metadata associated with these feature points for object motion estimation.

45. The video/audio processing apparatus according to claim 24, wherein the extracted feature points are used along with metadata associated with these feature points for estimating the camera motion.

46. The video/audio processing apparatus according to claim 45, wherein said estimated camera motion is used to facilitate a transcoding process between one compressed video representation into an other compressed video representation.

47. The video/audio processing apparatus according to claim 24, wherein the extracted feature points are used along with metadata associated with these feature points for calculating a motion activity model for video.

* * * * *